US011853635B2

(12) United States Patent
Yoganandan et al.

(10) Patent No.: US 11,853,635 B2
(45) Date of Patent: Dec. 26, 2023

(54) CONFIGURATION AND OPERATION OF DISPLAY DEVICES INCLUDING CONTENT CURATION

(71) Applicant: Samsung Electronics Co., Ltd., Suwon-si (KR)

(72) Inventors: Arun Rakesh Yoganandan, San Francisco, CA (US); Kumi Akiyoshi, San Francisco, CA (US); Melinda Yang, Mountain View, CA (US); Yuchang Hu, Santa Clara, CA (US); Mark Schlager, San Carlos, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 15/283,005

(22) Filed: Sep. 30, 2016

(65) Prior Publication Data
US 2017/0262247 A1    Sep. 14, 2017

Related U.S. Application Data

(60) Provisional application No. 62/305,938, filed on Mar. 9, 2016.

(51) Int. Cl.
*G06F 3/14* (2006.01)
*G09G 5/14* (2006.01)
(Continued)

(52) U.S. Cl.
CPC .......... *G06F 3/1446* (2013.01); *G06F 3/0482* (2013.01); *G06F 3/04845* (2013.01);
(Continued)

(58) Field of Classification Search
CPC .. G06F 3/1446; G06F 3/0482; G06F 3/04845; G06F 3/1423; G06F 3/1438;
(Continued)

(56) References Cited

U.S. PATENT DOCUMENTS

| 5,634,018 A | * | 5/1997 | Tanikoshi | ............... G06F 3/033 |
| | | | | 715/751 |
| 7,904,041 B2 | * | 3/2011 | Feher | .................... H04W 64/00 |
| | | | | 455/151.1 |

(Continued)

FOREIGN PATENT DOCUMENTS

| EP | 1178460 A2 | 2/2002 |
| EP | 1178460 A3 | 3/2003 |

(Continued)

OTHER PUBLICATIONS

U.S. Appl. No. 15/283,026 U.S. Non-Final_Rejection dated Feb. 7, 2018.*

(Continued)

*Primary Examiner* — Cesar B Paula
*Assistant Examiner* — John M Heffington
(74) *Attorney, Agent, or Firm* — SHERMAN IP LLP; Kenneth L. Sherman; Steven Laut

(57) ABSTRACT

Content management includes receiving an image of one or more display devices with respective first content displayed. For at least one display device, a display device identification (ID) is retrieved. A change to the first content displayed at the at least one display device is caused, based on the display device ID of the at least one display device, upon interaction with the image.

20 Claims, 28 Drawing Sheets

(51) Int. Cl.

| | |
|---|---|
| *G06F 3/147* | (2006.01) |
| *H04N 23/63* | (2023.01) |
| *H04N 23/80* | (2023.01) |
| *G06F 3/0482* | (2013.01) |
| *G06F 3/04845* | (2022.01) |
| *G06T 11/00* | (2006.01) |
| *G06T 11/40* | (2006.01) |
| *G06T 7/90* | (2017.01) |
| *G06T 7/70* | (2017.01) |
| *G06T 3/40* | (2006.01) |
| *G09G 5/377* | (2006.01) |

(52) U.S. Cl.
CPC ............ *G06F 3/147* (2013.01); *G06F 3/1423* (2013.01); *G06F 3/1438* (2013.01); *G06F 3/1454* (2013.01); *G06F 3/1462* (2013.01); *G06T 7/70* (2017.01); *G06T 7/90* (2017.01); *G06T 11/001* (2013.01); *G06T 11/40* (2013.01); *G09G 5/14* (2013.01); *H04N 23/63* (2023.01); *H04N 23/80* (2023.01); *G06T 3/40* (2013.01); *G06T 2207/10004* (2013.01); *G06T 2207/20024* (2013.01); *G06T 2210/22* (2013.01); *G09G 5/377* (2013.01); *G09G 2360/144* (2013.01); *G09G 2370/02* (2013.01); *G09G 2370/042* (2013.01); *G09G 2370/06* (2013.01); *G09G 2380/16* (2013.01)

(58) Field of Classification Search
CPC ...... G06F 3/1454; G06F 3/1462; G06F 3/147; G06F 3/14; G06F 3/048; G06T 7/70; G06T 7/90; G06T 11/001; G06T 11/40; G06T 3/40; G06T 2207/10004; G06T 2207/20024; G06T 2210/22; G09G 5/14; G09G 5/377; G09G 2360/144; G09G 2370/02; G09G 2370/042; G09G 2370/06; G09G 2370/16; G09G 2380/16; H04N 5/23229; H04N 5/23293; H04N 19/70

See application file for complete search history.

(56) References Cited

U.S. PATENT DOCUMENTS

| | | | | |
|---|---|---|---|---|
| 8,542,906 B1* | 9/2013 | Persson | ................ | G06V 20/20 |
| | | | | 382/103 |
| 8,953,050 B2 | 2/2015 | Huang et al. | | |
| 9,092,674 B2 | 7/2015 | Andrade et al. | | |
| 9,092,896 B2 | 7/2015 | Scavezze et al. | | |
| 9,154,732 B2 | 10/2015 | Guleryuz et al. | | |
| 9,195,898 B2 | 11/2015 | Huang et al. | | |
| 9,286,025 B2 | 3/2016 | Jain et al. | | |
| 9,398,210 B2 | 7/2016 | Stach et al. | | |
| 9,516,218 B1* | 12/2016 | Tohidi | ................ | H04N 5/23222 |
| 2004/0161246 A1* | 8/2004 | Matsushita | ........... | G06F 3/0481 |
| | | | | 398/187 |
| 2007/0094703 A1* | 4/2007 | Nygaard | ............. | G11B 27/034 |
| | | | | 725/135 |
| 2008/0057886 A1* | 3/2008 | Feher | ................... | H04W 64/00 |
| | | | | 455/151.1 |
| 2008/0129844 A1* | 6/2008 | Cusack | ............. | H04N 5/23229 |
| | | | | 348/241 |
| 2008/0165082 A1* | 7/2008 | Manico | ................ | G06F 1/1601 |
| | | | | 345/1.3 |
| 2009/0285484 A1 | 11/2009 | Mallinson et al. | | |
| 2009/0322915 A1* | 12/2009 | Cutler | ................ | H04N 5/23219 |
| | | | | 348/251 |
| 2010/0138797 A1* | 6/2010 | Thorn | .................... | G06F 3/017 |
| | | | | 715/863 |
| 2011/0090322 A1 | 4/2011 | Lawther et al. | | |
| 2011/0216966 A1* | 9/2011 | Cok | .................... | G06T 11/001 |
| | | | | 382/162 |
| 2012/0027294 A1* | 2/2012 | Krolczyk | ................ | G06T 11/60 |
| | | | | 382/165 |
| 2012/0185790 A1* | 7/2012 | Bae | ........................ | G06F 3/0488 |
| | | | | 715/769 |
| 2012/0218444 A1 | 8/2012 | Stach et al. | | |
| 2012/0290981 A1* | 11/2012 | Uchida | .................. | G08C 23/04 |
| | | | | 715/810 |
| 2013/0042259 A1* | 2/2013 | Urbach | ............... | G06F 3/04842 |
| | | | | 719/329 |
| 2013/0235085 A1* | 9/2013 | Kim | ................... | H04N 21/6125 |
| | | | | 345/660 |
| 2013/0315445 A1* | 11/2013 | Schlieski | ......... | H04N 21/41407 |
| | | | | 382/103 |
| 2013/0329061 A1 | 12/2013 | Jeung et al. | | |
| 2014/0058825 A1 | 2/2014 | Raman et al. | | |
| 2014/0193037 A1 | 7/2014 | Stitzinger et al. | | |
| 2015/0071495 A1* | 3/2015 | Makkonen | ............. | H04N 23/64 |
| | | | | 382/103 |
| 2015/0116511 A1* | 4/2015 | Takahashi | .......... | H04N 1/00156 |
| | | | | 348/207.11 |
| 2015/0153994 A1 | 6/2015 | Ueda et al. | | |
| 2015/0262208 A1 | 9/2015 | Bjontegard | | |
| 2015/0279037 A1 | 10/2015 | Griffin et al. | | |
| 2015/0279101 A1 | 10/2015 | Anderson | | |
| 2015/0286456 A1 | 10/2015 | Griffin et al. | | |
| 2015/0296324 A1 | 10/2015 | Garaas et al. | | |
| 2016/0049006 A1 | 2/2016 | Mullins et al. | | |
| 2016/0086031 A1* | 3/2016 | Shigeno | ................. | G06V 20/00 |
| | | | | 382/103 |
| 2016/0086513 A1 | 3/2016 | Uejima et al. | | |
| 2016/0150104 A1* | 5/2016 | Wagatsuma | .......... | G06F 3/1205 |
| | | | | 358/1.15 |
| 2016/0342839 A1* | 11/2016 | Condel | ..................... | G06F 3/00 |
| 2017/0068501 A1* | 3/2017 | Choe | .................. | H04N 1/00448 |
| 2017/0228138 A1 | 8/2017 | Paluka et al. | | |
| 2017/0262245 A1 | 9/2017 | Yoganandan et al. | | |

FOREIGN PATENT DOCUMENTS

| | | | |
|---|---|---|---|
| EP | 2597796 | A1 | 5/2013 |
| EP | 2597796 | A3 | 12/2013 |
| EP | 2701099 | A1 | 2/2014 |
| EP | 2945407 | A1 | 11/2015 |
| KR | 20120008191 | A | 1/2012 |
| KR | 2014-0090263 | A | 7/2014 |
| WO | 2005006440 | A2 | 1/2005 |
| WO | 2011-019154 | A2 | 2/2011 |
| WO | 2011019154 | A2 | 2/2011 |
| WO | 2011019154 | A3 | 2/2011 |
| WO | 2015077455 | A1 | 5/2015 |

OTHER PUBLICATIONS

International Search Report and Written Opinion dated May 23, 2017 for International Application PCT/KR2017/002182 from Korean Intellectual Property Office, pp. 1-13, Republic of Korea.

International Search Report and Written Opinion dated May 23, 2017 for International Application PCT/KR2017/002191 from Korean Intellectual Property Office, pp. 1-13, Republic of Korea.

U.S. Notice of Allowance for U.S. Appl. No. 15/283,026 dated Jul. 17, 2018.

Extended European Search Report dated Dec. 13, 2018 for European Application No. 17763498.7 from EuropeanPatent Office, pp. 1-10, Munich, Germany.

Extended European Search Report dated Feb. 18, 2019 for European Application No. 17763499.5 from EuropeanPatent Office, pp. 1-12, Munich, Germany.

Korean Office Action dated Apr. 27, 2021 for Korean Patent Application No. 10-2017-0030276 fromKorean Patent Office, pp. 1-12, Seoul, South Korea (English-language translation included pp. 1-6).

Korean Office Action dated Apr. 23, 2021 for Korean Patent Application No. 10-2017-0030275 from Korean Patent Office, pp.

(56) References Cited

OTHER PUBLICATIONS 1-12, Seoul, South Korea (English-language translation included pp. 1-6).

Korean Notice of Allowance dated Oct. 8, 2021 for Korean Patent Application No. 10-2017-0030275 from Korean Patent Office, pp. 1-6, Seoul, South Korea (Engligh-language translation included pp. 1-4).

Korean Notice of Allowance dated Aug. 27, 2021 for Korean Patent Application No. 10-2017-0030276 from Korean Patent Office, pp. 1-5, Seoul, South Korea (English-language translation included pp. 1-3).

European Office Action dated Apr. 20, 2023 for EP Patent Application No. 17763498.7 from European Patent Office, pp. 1-8, The Netherlands.

European Summons to Attend Oral Proceedings dated Apr. 26, 2023 for EP Patent Application No. 17763498.7 from European Patent Office, pp. 1-10, The Netherlands.

U.S. Non-Final Office Action for U.S. Appl. No. 15/283,026 dated Feb. 7, 2018.

\* cited by examiner

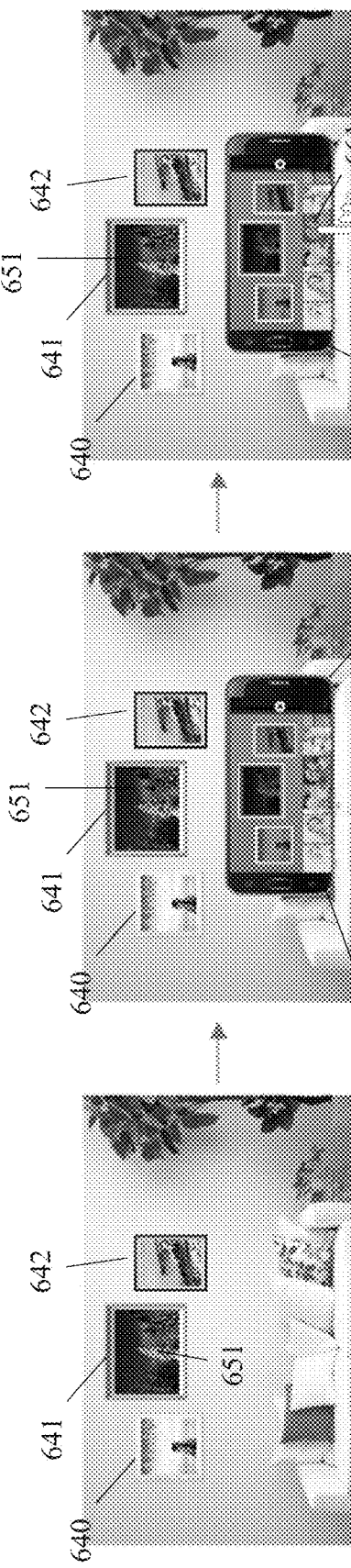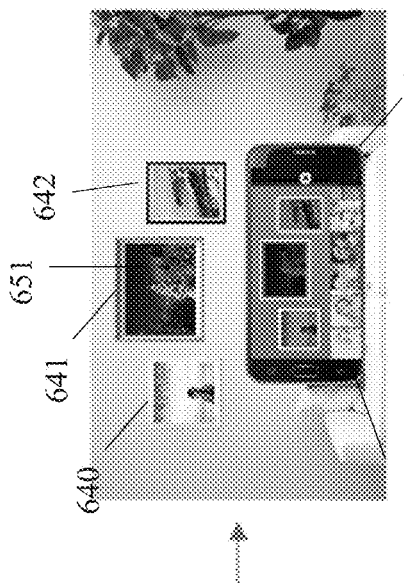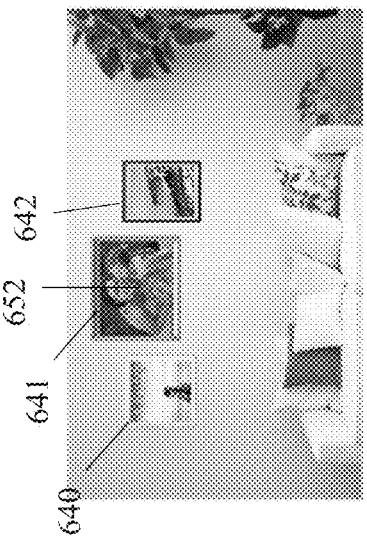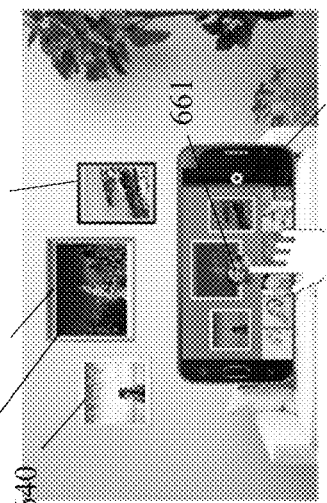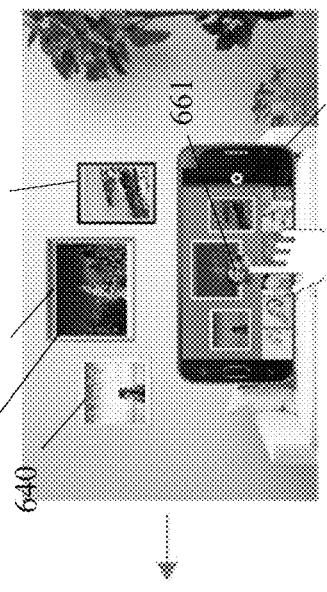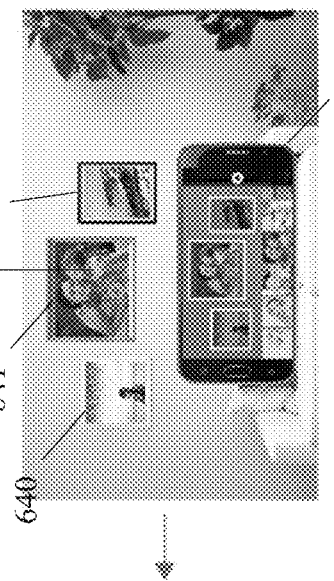

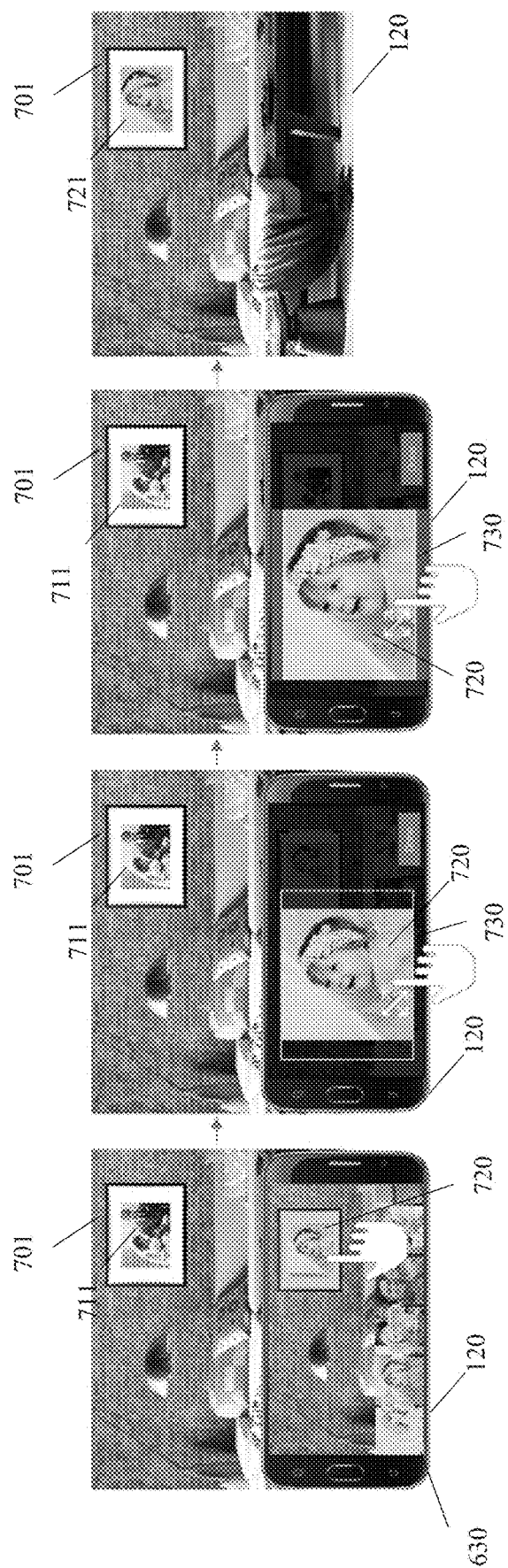

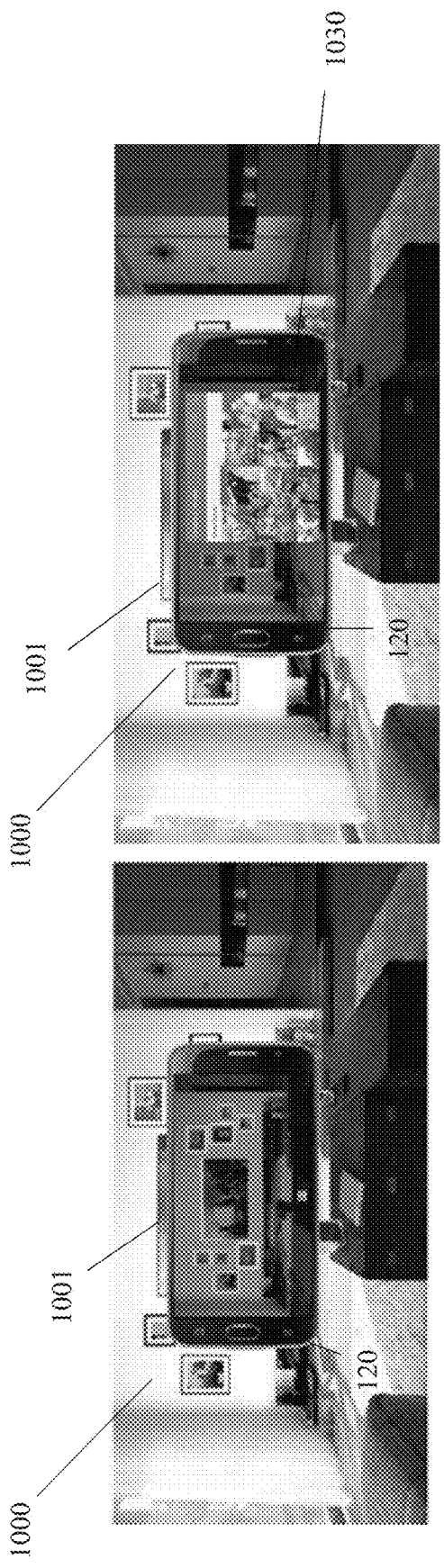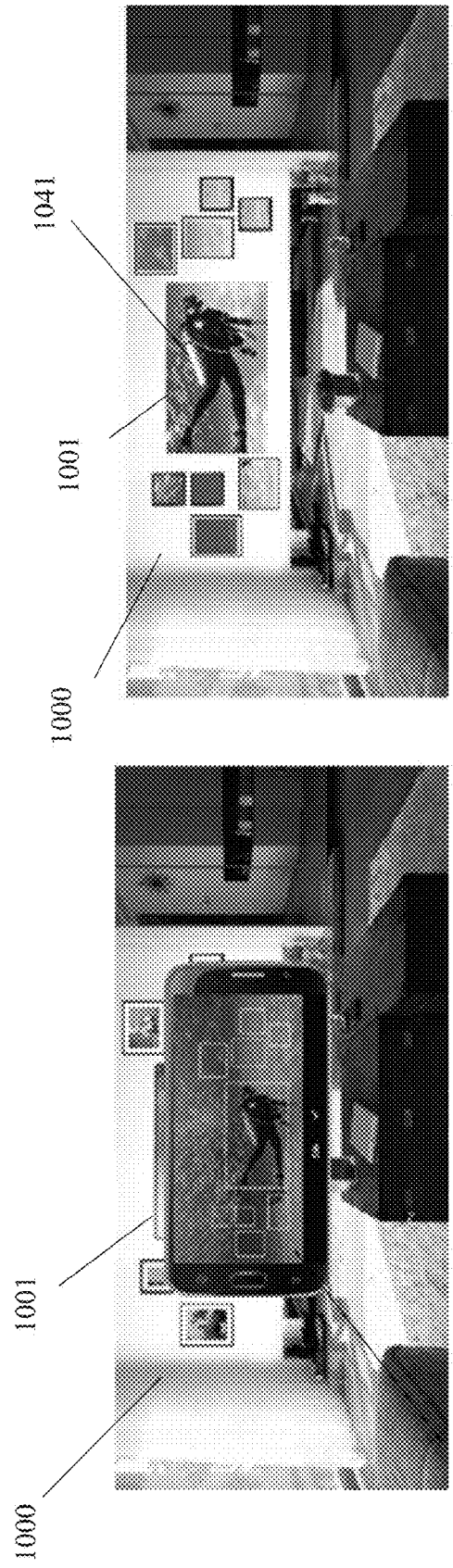

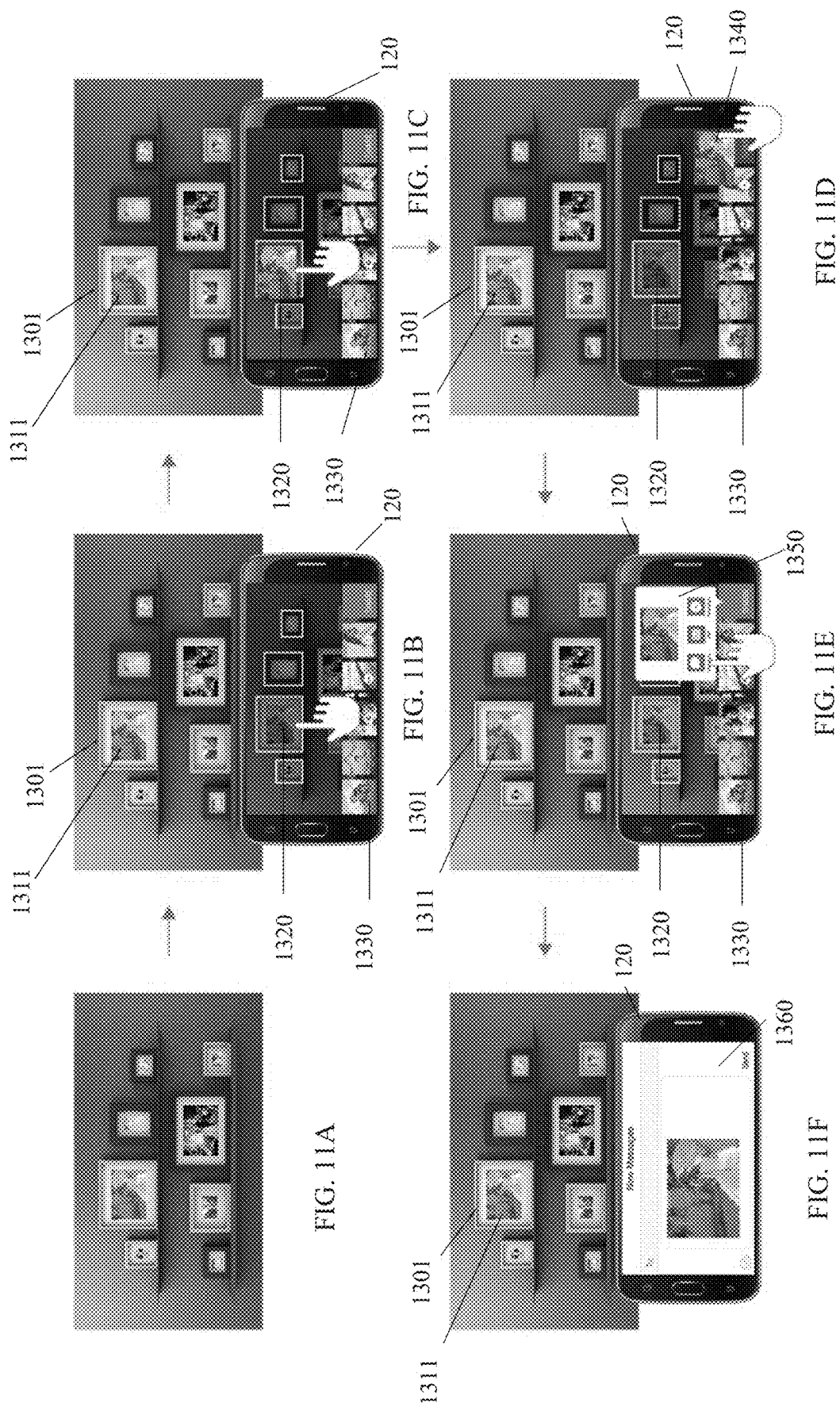

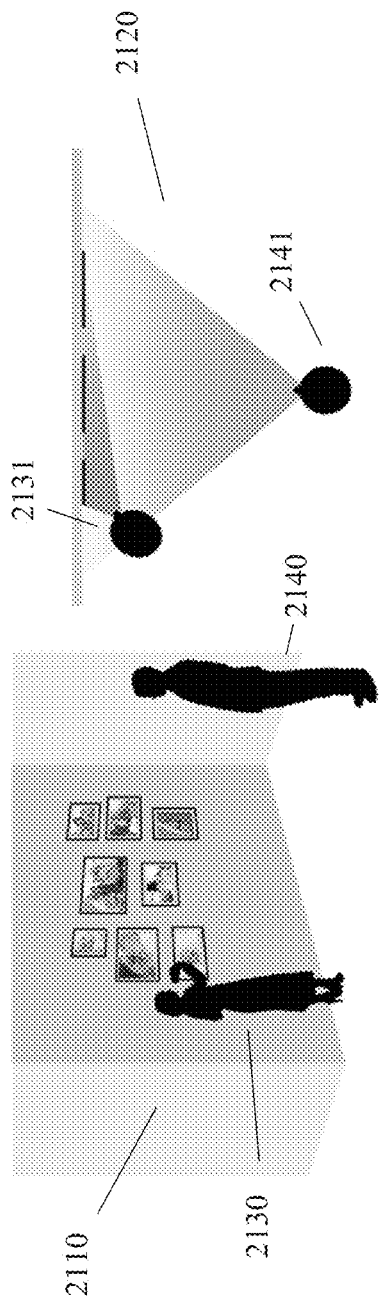
FIG. 19
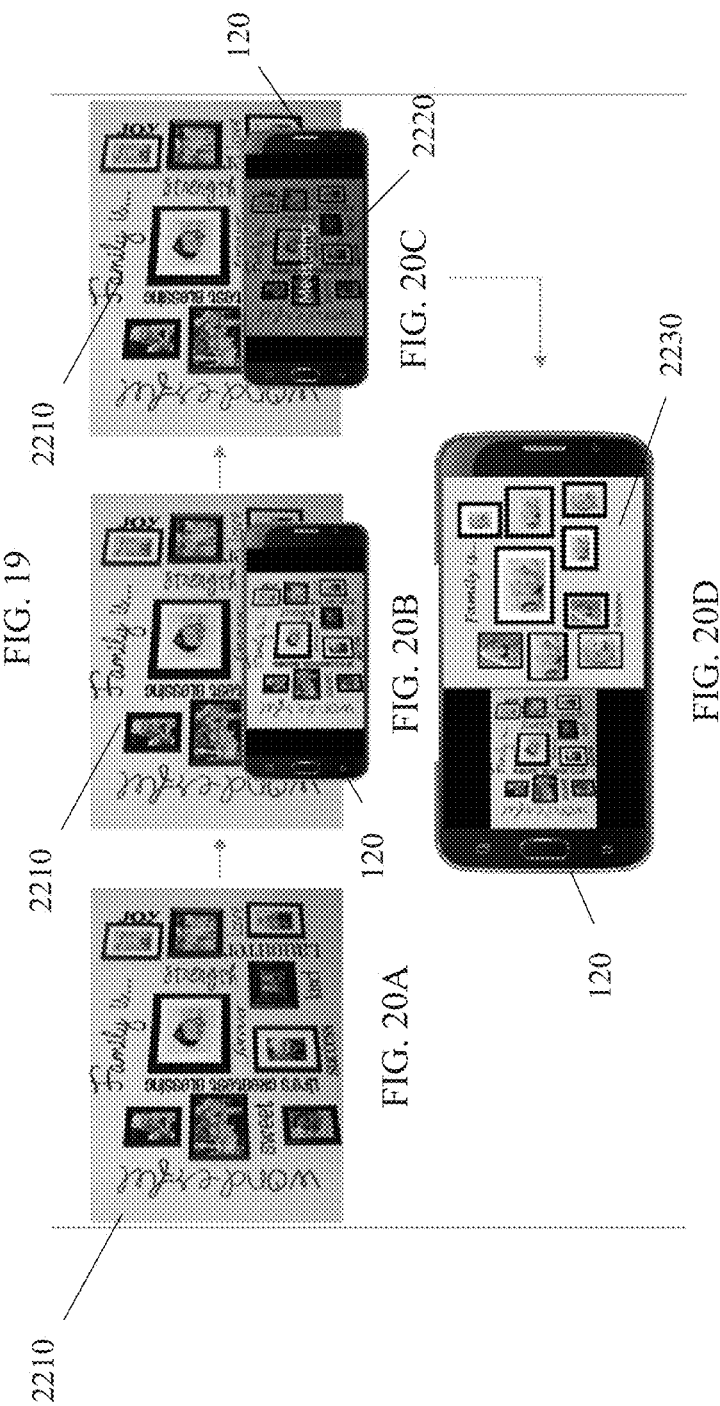
FIG. 20A
FIG. 20B
FIG. 20C
FIG. 20D

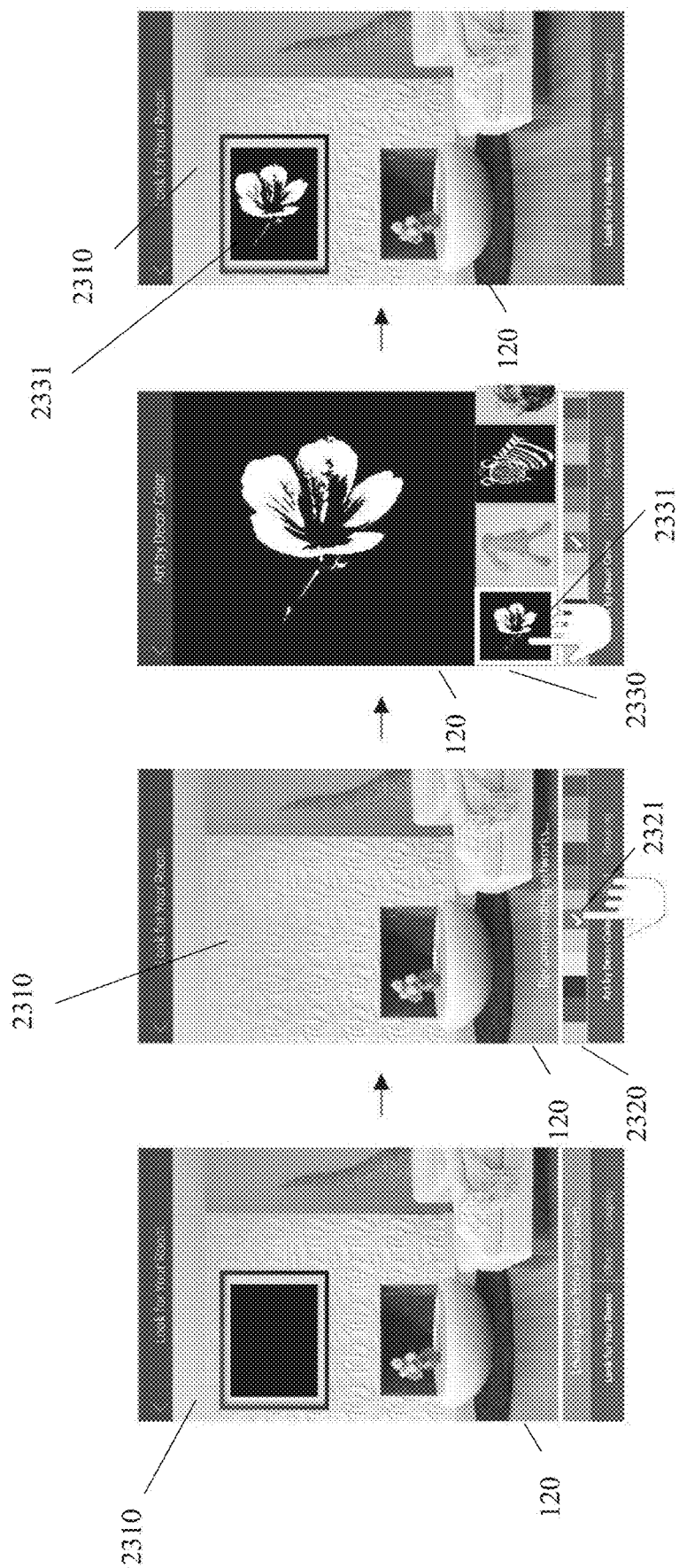

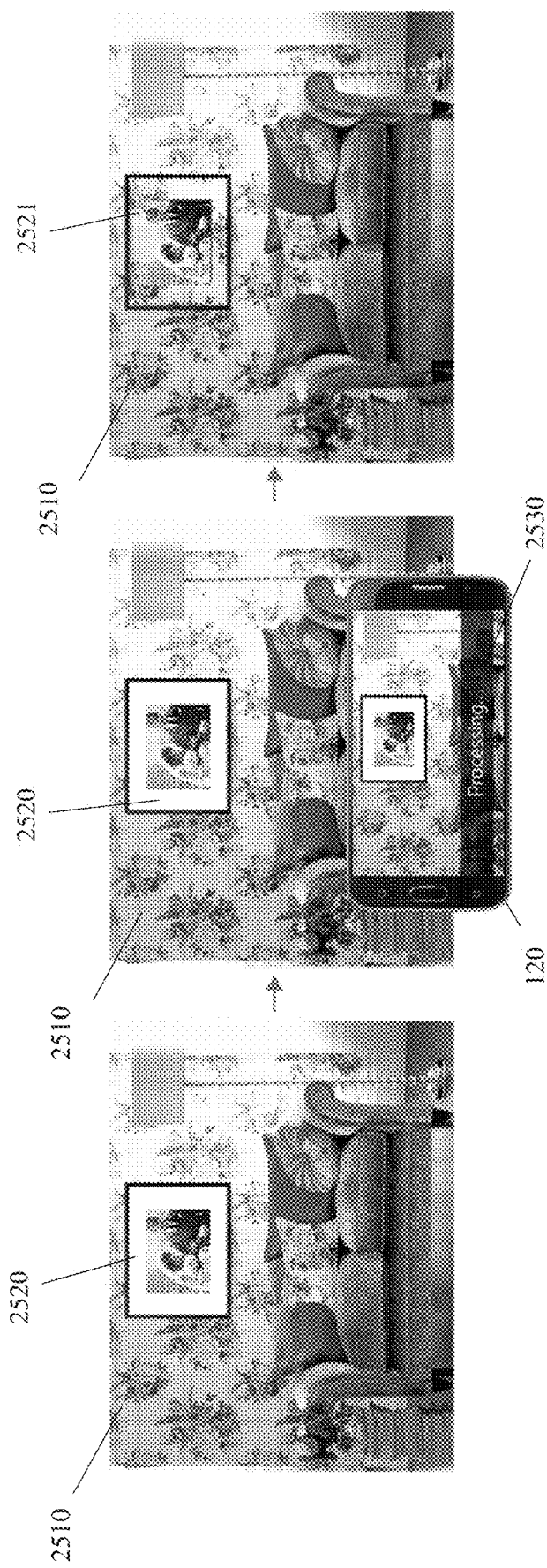

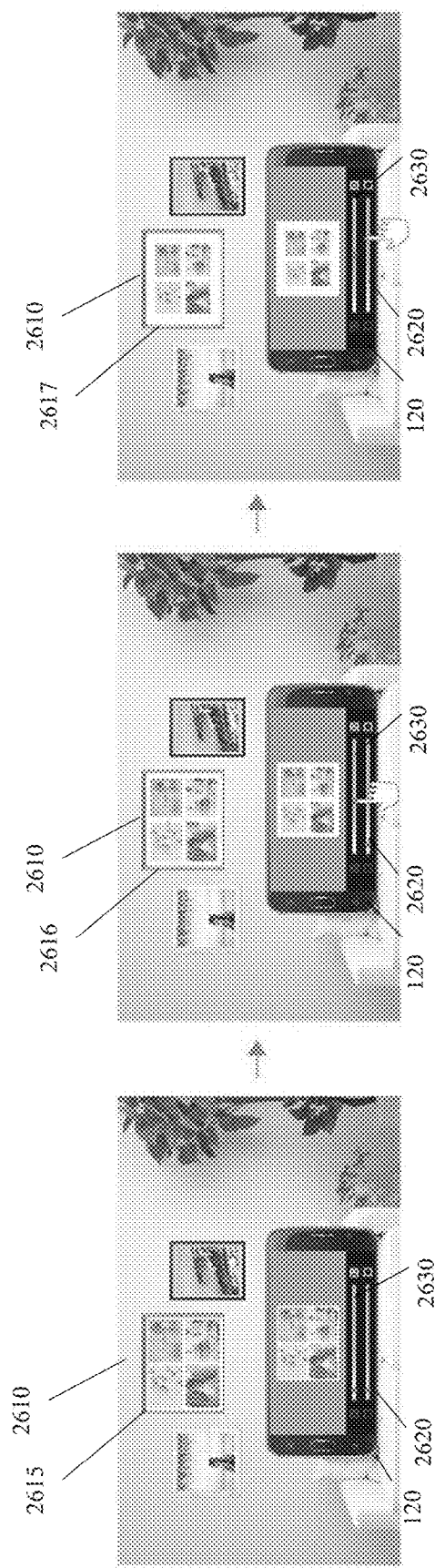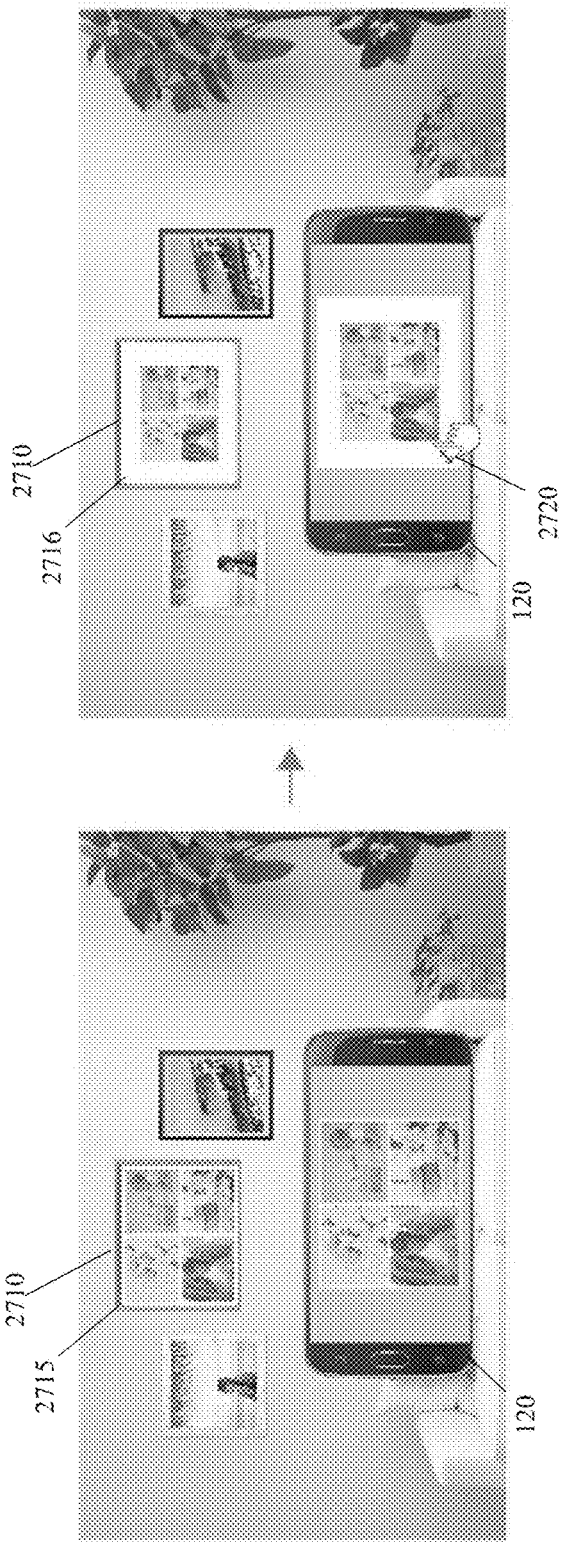

CONFIGURATION AND OPERATION OF DISPLAY DEVICES INCLUDING CONTENT CURATION

CROSS-REFERENCE TO RELATED APPLICATIONS

This application claims the priority benefit of U.S. Provisional Patent Application Ser. No. 62/305,938, filed Mar. 9, 2016, which is incorporated herein by reference in its entirety.

TECHNICAL FIELD

One or more embodiments generally relate to display devices and, in particular, to configuring and controlling display devices including content curation.

BACKGROUND

As the ecosystem of devices and displays grows, there is often a need for users to transfer content from one device to the other. In spite of the availability of communication systems such as BLUETOOTH® and Wi-Fi, the interaction interfaces used to achieve these operations continue to be very unintuitive. Typically, a user would need to find and remember the name of the display, its representation in a network/network identification (ID), look it up from a list of names and select that name to connect to the display. This issue is compounded when the user has to curate a cluster of displays, making it very hard to know which display they are currently working with.

SUMMARY

One or more embodiments generally relate to configuring and controlling display devices including content curation. In one embodiment, a method provides for content management that includes receiving an image of one or more display devices with respective first content displayed. For at least one display device, a display device identification (ID) is retrieved. A change to the first content displayed at the at least one display is caused, based on the display device ID of the at least one display device, upon interaction with the image.

In another embodiment, a device for content management includes a memory storing instructions and at least one processor executing the instructions including a process configured to: receive an image of one or more display devices with respective first content displayed; for at least one display device, retrieve a display device ID; and cause a change to the first content displayed at the at least one display device, based on the display device ID of the at least one display device, upon interaction with the image.

In one embodiment non-transitory processor-readable medium that includes a program that when executed by a processor perform a method comprising: receiving an image of one or more display devices with respective first content displayed. For at least one display device, a display device ID is retrieved. A change to the first content displayed at the at least one display is caused, based on the display device ID of the at least one display device, upon interaction with the image.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIGS. 5A-F show a sequence diagram for an example of managing the image content displayed on a cluster of multiple display devices, according to an embodiment;

FIGS. 6A-D show a sequence diagram of an example for managing the image content displayed on a display device by adjusting scale, according to an embodiment;

FIGS. 8A-D show diagrams of an example for managing the image content displayed on multiple display devices by overlaying on top of a selected image content during the image content selection process so that the image content is cropped over a whole group of display devices including the spaces among them, according to an embodiment;

FIGS. 11A-F show a sequence diagram of an example for sharing image content shown in any of the multiple display devices, according to one embodiment;

FIG. 19 shows an example illustration of different viewing perspectives based on relative location of viewer, for multiple display devices;

FIGS. 20A-D show an example illustration of determining the position of an ideal view point, based on the size, shape and overall layout of multiple display devices, according to one embodiment;

FIGS. 21A-D show an example illustration of capturing a frame, analyzing the prominent colors in a room and displaying these colors as a scrollable list and presenting images based on the list on an electronic device, according to one embodiment;

FIGS. 23A-C show an example illustration of identifying repeating patterns, and digitally synthesizing the patterns to provide a similar transparent mat effect for a display device, according to one embodiment;

FIGS. 24A-C shows an example of customizing matting for imaging on a display device, according to an embodiment;

FIGS. 25A-B shows another example of customizing matting for imaging on a display device, according to an embodiment;

DETAILED DESCRIPTION

Figure 1:
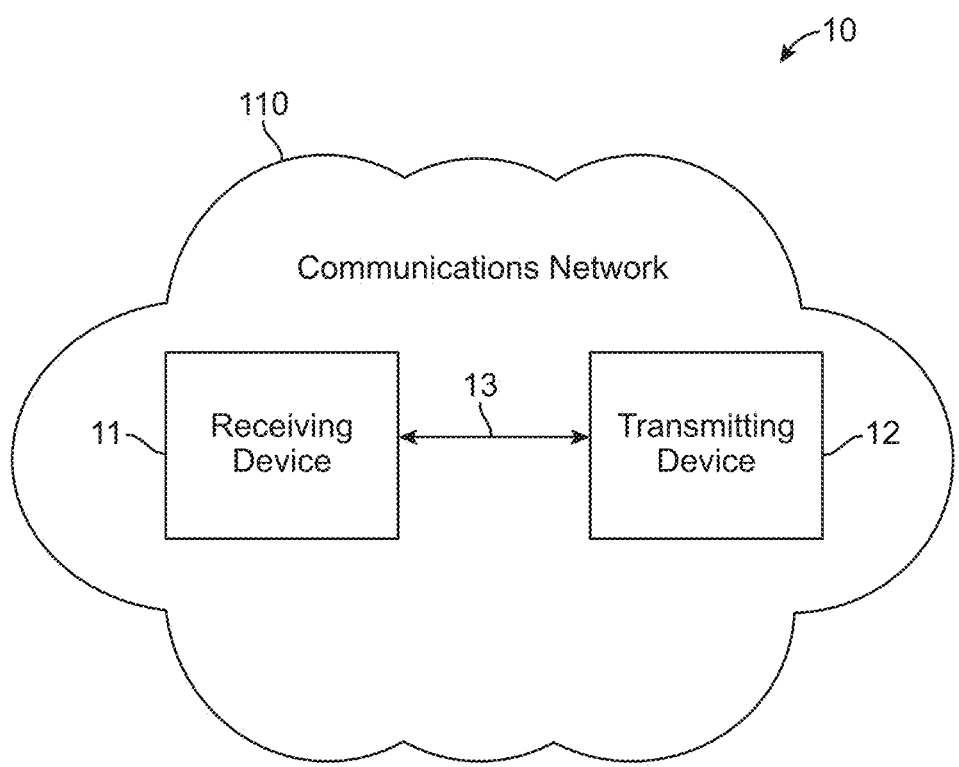
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for easy content curation for a cluster of display devices (e.g., tablets, monitors, digital photo display frames, computing displays, television displays, projected displays, etc.) using computer vision and augmented reality (AR) based technologies in a visual and spatially intuitive manner. The embodiments provide processing for saving and retrieving virtual representations of a cluster of displays and curate them locally or remotely using a mobile device (e.g., smart phone, tablet, wearable device, portable computing device, etc.).

One or more embodiments provide a unique way of visually identifying and directly interacting with a display or a cluster of displays, that results in intuitive interactions. Additionally, advanced user interactions may be employed, such as drag and drop of selected content directly on to visual representations of displays instead of textual representations, such as network ID, BLUETOOTH® ID, etc. or of symbolic representations such as folders or icons.

One or more embodiments provide spatially intelligent image editing and curation of displays (where image means both still images—photo, and moving images—video). Images may be cropped to aspect ratios, that better match that of the displays that showcase them. Single images may be processed to be spread across multiple displays in a spatially coherent manner. Selective display of certain important regions/features of an image may be displayed on selected displays. Special effects, such as filters, may be assigned to specific displays through spatial interactions.

One or more embodiments provide for saving and retrieving virtual representations of a cluster of displays as virtual walls, which may be used to curate a cluster of displays even when geographically removed from the displays, while retaining the familiar user experience. Additionally, processing is provided to group clusters of displays into various groups and specify each group's properties such as collective behavior, content to be displayed, group special effects, etc. Dynamic reassignment of a particular display from one group to another is provided and exceptions are available to group behavior.

One or more embodiments provide for easy planning, arrangement, alignment and mounting of a cluster of displays using computer vision and AR based technologies in a visual and spatially intuitive manner. Partial or full blending of displays with the environment is provided by mimicking their features such as color, texture, material and patterns. Processing provides for measurements, calculations and for suggestions for possible arrangements of displays along with specific measurements for placement of the displays. Immediate feedback about positioning and alignment of the displays is provided, and displays may be visually pointed to for corrections, which guides users to get closer to the desired configuration desired.

Based on the ambience of the display cluster, such as color of the physical wall, available illumination, difference in color palette between the images in the display cluster, one or more embodiments provide for suggestions of suitable image filters that can enhance present images in the display in a visually pleasant manner. This ambient information may be used to suggest photos and artwork, either from the local collection or from curated services that best match the ambience of the room in which the display is placed.

One or more embodiments provide information for a far away or more ideal viewpoint of the cluster of displays, even when standing near or to their side by using perspective correction. The ambient information (such as color, texture and pattern of physical wall) is used to blend in with the environment, partially or fully by mimicking the details of a wall in certain areas of the display. Emulation of various physical mats of analog picture frames on digital picture frames is provided.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
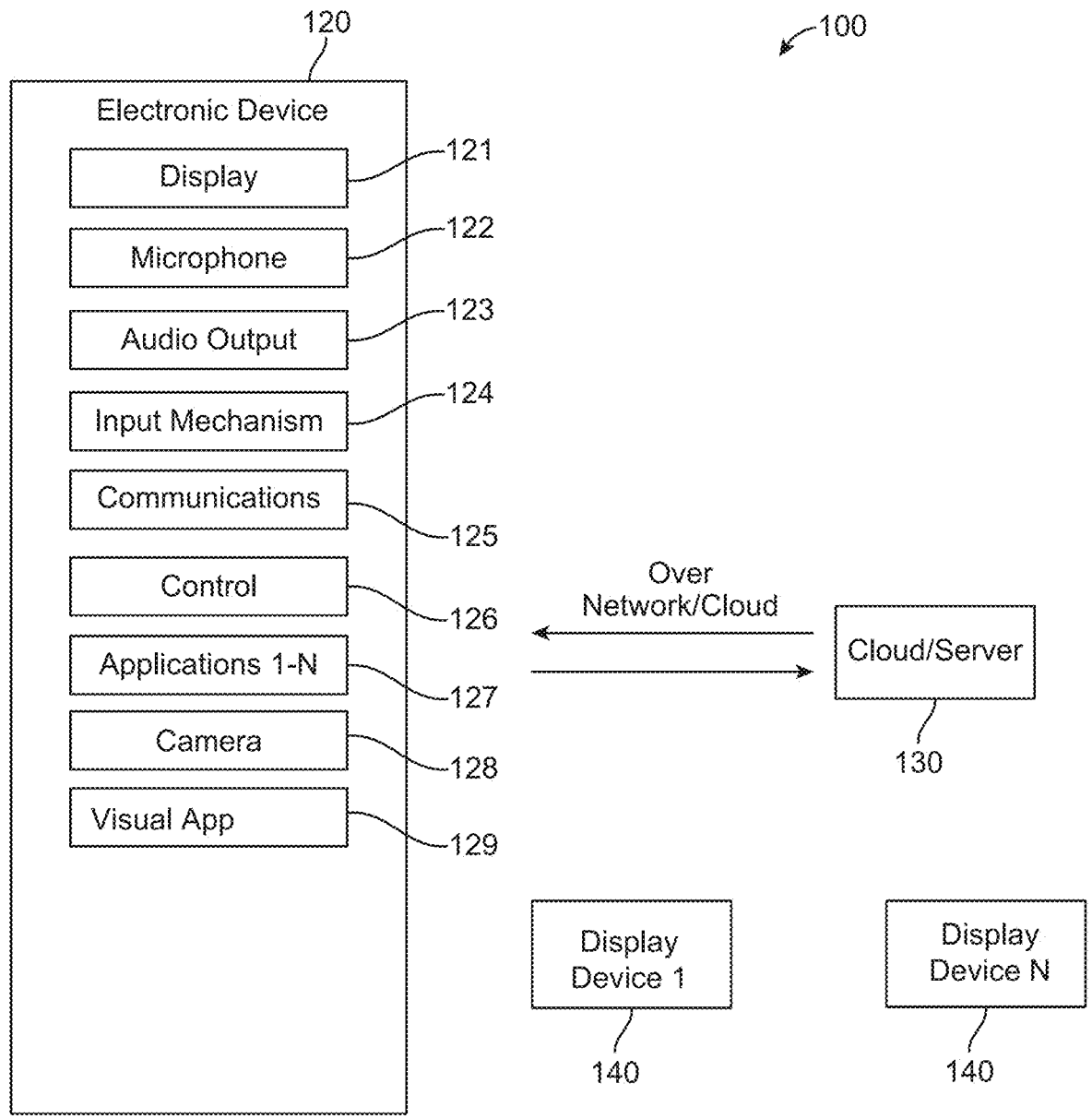
FIG. 2 shows a block diagram of architecture for a system including a mobile device including a content playback module, according to an embodiment.
Figures 3A, 3B, 3C, 3D:
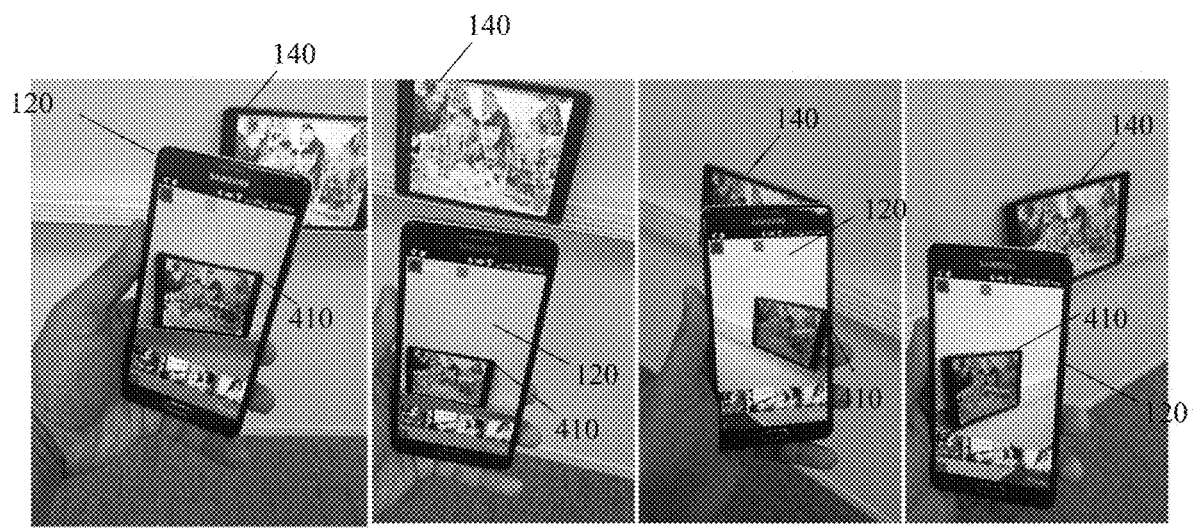
FIGS. 3A-D show an example of continuous lock of virtual overlays on an electronic device for a display device, according to an embodiment.

FIG. 2 shows a functional block diagram of an architecture system 100 that may be used for configuring and controlling display devices 1-N 140 (e.g., tablets, monitors, digital photo display frames, computing displays, television displays, projected displays, etc.; where N is ≥0) including content curation using an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, a visual app 129 (for controlling display device content curation, management, arrangement, etc.), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the visual app 129 comprises processes and/or programs for managing content, curating content and providing arrangement of display devices. The content may include: visual content, graphic images, video content, photos, etc. The visual app 129 may include any of the processing, curating, controlling, managing and arranging of content and/or display devices as described below.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

FIGS. 3A-D show an example of continuous lock of a virtual overlay 410 on the electronic device 120 for a display device 140, according to an embodiment. In one example, as the user moves around holding the electronic device 120, keeping the display device 140 within the field of view of the electronic device 120, the virtual overlay is continually matched and locked to the respective display. In one embodiment, this is achieved by means of AR technologies that combine pattern matching (e.g., pattern matching using instance-level object detection, category-level object recognition, block-based visual-pattern matching, etc.), computer vision and computer graphics. In one example, a pattern matching processor (e.g., processor 3111, FIG. 29) or process (e.g., visual app 129 or content curation and display management processing 3130), which is part of the AR library (e.g., part of visual app 129 and/or applications 1-N 127), resides on electronic device 120 and is trained to detect a finite set of images. When the electronic device 120 is pointed at a display device 140 and if the image being displayed in the display device 140 is present in the electronic device 120's pattern matching database, the pattern matching process or processor provides the AR library with details such as presence of an image, and the name of the image identified. The AR library then uses its computer vision process or processor to determine where in the scene this pattern is present, and details such as the location of its four corners. The AR library then uses its computer graphics process or processor to overlay desired visual effects within the detected four corners, that provide the illusion of a virtual overlay that remains locked to display device 140.

In one example, the virtual overlay 410 may allow advanced user interfaces elements to be superimposed on top of them. These elements may include buttons and widgets that may be used to modify the state of the display device 140 (such as color, saturation, filters, etc.) to which the electronic device 120 is pointed at. Additionally, more advanced interactions such as dragging content/effects from a gallery on to the virtual overlay 410 are also possible. Putting all the above together, a user may detect and manipulate properties of a display device 140 simply by pointing at it with the electronic device 120. This allows for very intuitive visual and spatially coherent interactions with display devices 140 and provides a satisfying user experience.

The above mentioned computer vision technology also provides the capability to measure the position, orientation, aspect ratio and dimensions of a display device 140 with respect to its neighbors. In one embodiment, the AR library simultaneously tracks multiple image targets using its pattern matching library (e.g., part of visual app 129 and/or applications 1-N 127). This allows the electronic device 120 to setup these virtual overlays on top of each display device 140 in a cluster of displays which is displaying a familiar image. This collection of virtual overlays may then be analyzed spatially to determine which display device 140 is to the left of the other display devices 140, above yet another display device 140, etc. The relative positioning of a cluster of display devices 140 can thus be determined. Based on the relative orientations of the edges of one virtual overlay with respect to that of another, the electronic device 120 determines the relative orientations of these display devices 140. The relative orientation of a cluster of display devices 140 can thus be determined. It should be noted that the aspect ratio of a display device 140 is the ratio between the width and height. Display devices 140 may have formatting in varying popular aspect ratios, such as 4:3, 16:9, 16:10 etc., depending on their use case and the appropriate media with the correct aspect ratio needs to be displayed in the display device 140 in order to avoid letterboxing or presence of black lines on the horizontal or vertical extremes. Each display device 140 inherently knows its own aspect ratio and physical dimensions. As soon as the electronic device 120 is pointed at display device 140 and identified, the electronic device 120 uses network communication to query display device 140's aspect ratio and dimensions, which is communicated by display device 140 and used by electronic device 120 in further calculations. In one embodiment, the aspect ratio of display device 140 may be determined without network communication. With the virtual overlays mentioned above, electronic device 120 may compare the width and height of the virtual overlays to determine the observed aspect ratio of the display device 140. When presented with a cluster of display devices 140, this technology may be used to assess the relative placement, alignment and size differences of one display device 140 with respect to another display device 140 within the cluster. Since the above mentioned computer vision technology may be used to assess the placement, alignment and size of one display device 140 with respect to another display device 140, it may be used to effectively spread a single image across multiple display devices 140 in a spatially coherent manner, that takes into account the gap between them (see, e.g., FIGS. 7D and 8D).

In one embodiment, the multi-display device 140 environment illustrated in FIG. 5A provides identification of physical aspects of the display devices 140 may be performed using the mobile device 120, according to an embodiment. In one example, a single display device 140 or a cluster of display devices 140, are also referred to as modular display devices 140 of the same or varying sizes. The display devices 140 are all connected on a same network. The network may be any wired or wireless communication channel such as Wi-Fi, BLUETOOTH®, LAN, WAN, cellular, etc. Each display device 140 has a unique network ID that may be used to assess and communicate with other devices connected to the network. Each display device 140 may or may not have touch or touchless gestural interaction features. In one example, an initial setup process may be required to add a display device 140 into a local network. For example, a user may pass local network configuration data from an electronic device 120 to each display device 140 through other technologies it may possess such as near field communication (NFC), USB, etc.

In one embodiment, the display devices 140 may include a spectrum of light emitting diodes (LEDs) (visual or infrared) or other physical markers on the bezel/border of the display device 140 frames, allowing distinct identification of each display device 140 using computer vision technology. In one example, a user has access to a mobile device 120 with a camera 128, with input technologies such as multi-touch or air gesture, which is on the same network as the rest of the display devices 140. The camera's 128 field of view may be adjustable to view a wide area or zoomed in to focus on a narrow area. In one example, the display devices 140 may also be connected via the network to other entertainment devices such as TVs and speakers.

In one embodiment, the electronic device 120 performs interactions with and commands a display device 140 by using the camera 128 to view the display device 140 and use of the visual app 129. This interaction may be referred to as direct interaction/manipulation. In one example, tracking of display devices 140 is provided using the electronic device 120, which is the ability to determine the position, orientation and size of each display device 140 with respect to other display devices 140, the electronic device 120 and the room the display devices 140 are located.

Computer vision has progressed to a point where several processes may be used to track display devices 140.

Frame Markers: Display devices 140 may display specific predefined patterns known as markers, with which they may be identified. These markers typically take the form of checkerboard like patterns, that are unique. There are several types of these markers in varying complexities. In one example, QR codes and bar codes are specific examples of markers.

Image targets: Advances in pattern matching provide use of regular images as ways to identify and track a display device 140. This may be applied to either the currently displayed image, or each display device 140 may have a unique default image that it uses for the same purpose.

Character recognition: a display device 140 can display specific text that may be used both for tracking and for visually communicating other meta-data.

Watermarked markers: images displayed may be encrypted with invisible watermarks (which can only be picked up by the camera 128) that may be used as a way to identify a display device 140.

LEDs embedded in the frame: visible/invisible LEDs or other light emitting elements may be embedded in the bezel of a display device 140. These elements may then be sequenced to blink in a particular way and/or in specific colors, that will allow identifying and tracking the display device 140.

Physical features of frame: with modern AR software being able to pattern match 3D models and track in real time, display devices 140 with unique physical features may serve as a way for identifying and tracking a display device 140.

One or more embodiments are described below with image targeting technology. However, it should be noted that other tracking techniques may also be used as well.

Communication link technology described herein uses computer vision technology at its core, which allows identifying a known image when viewed through a camera 128 of electronic device 120. In one embodiment, all display devices 140 in the network can constantly communicate with each other to update each other with details such as name of the currently displayed image, their network ID, their aspect ratio, etc. As a result, every display device 140 on the network, including the electronic device 120, contains a look up table that shows the relationship between network ID and currently displayed image. An example for a look up table provided below:

| Network ID | Current Image |
| --- | --- |
| 1 | IMG3 |
| 2 | IMG1 |
| 3 | IMG5 |

In one embodiment, when an electronic device 120 is pointed to a cluster of display devices 140, it does not immediately know which display corresponds to which network ID. In one embodiment, the electronic device 120 has a pattern library, that constitutes its 'known' set of imagery. Each pattern is associated with an image identifier. The electronic device 120 used the visual app 129 to constantly scan each frame it captures with the camera 128 to see if any of the features in the captured image match with any content of the pattern library. When the electronic device 120 observes and recognizes a known image on a display 120, it then uses the look up table to identify the network ID of that specific display device 140 and henceforth uses it to communicate any subsequent commands or changes to that display device 140. The pattern library used by the electronic device 120 may reside on the electronic device 120 or be accessed on the cloud/server 130 (FIG. 2). Every image captured via the camera 128 is put through a pre-processing stage, where the image is analyzed, defined as a pattern and added to the pattern library and to the cloud/server 130. The cloud/server version of the pattern library may constantly synchronize with other users and other devices to ensure it is up to date with data. In one embodiment, all updates to the pattern library is done directly at the cloud/server. In another embodiment, device 120 or 140 initiates pattern library synchronization with the cloud/server every time it makes a change to its local pattern library. Each display device 140 may also be pre-loaded with a unique image, which serves as its default image and which in turn allows uniquely identifying the display device 140.

In one embodiment, computer vision technology is also used to identify the physical dimensions of the display device 140 and its relative position and orientation with respect to the display 121 of the electronic device 120. Computer graphics technologies may be employed to render digital/virtual overlays 510 (FIG. 4B) on the display 121 of the electronic device 120, that are on top of and encompass views of these display devices 140.

Figure 4A:
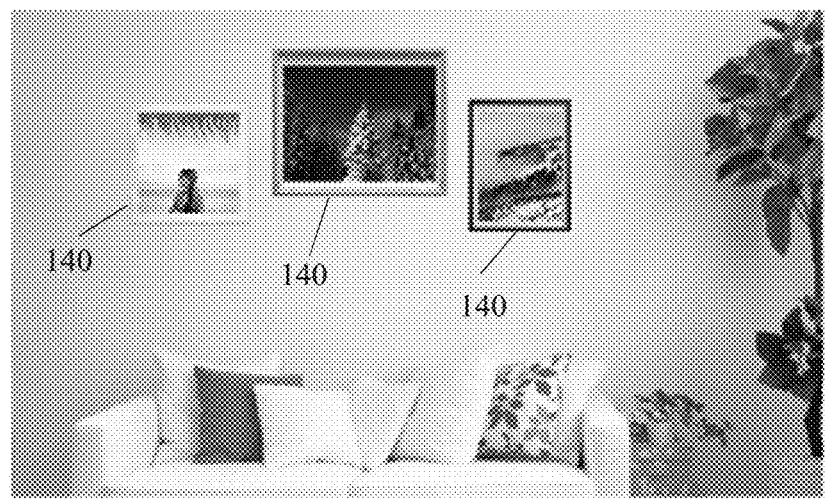
FIG. 4A shows an example of a cluster of multiple display devices, according to an embodiment.

FIG. 4A shows an example of a cluster of multiple display devices 140, according to an embodiment. The relationship between the cluster of display devices 140 and their virtual overlays (e.g., overlays 510, FIG. 4B) may be captured into a snapshot referred to as a virtual wall, which is a combination of live imagery that shows the room/environment in which these display devices 140 are placed in (plants, desk, books, etc.) as well as their virtual overlays. One or more embodiments provide saving and retrieving of these virtual walls in order to manipulate them at any time. These virtual walls may be thought of as a photo of the room, captured by the camera 128, where the content in the display devices 140 alone get updated with time. In one embodiment, the virtual walls may take the form of a standard rectangular image. In another embodiment, these virtual walls may be a panoramic image, such as a 360-degree (or other angle) image captured by either multiple cameras 128 on the electronic device 120 or sweeping around the electronic device 120 with a single camera 128 or other known methods. As the physical display devices 140 get updated with new images, the virtual walls containing these display devices 140 have their corresponding virtual overlay updated. Users may drag and drop content on to these virtual overlays within these virtual walls to update a real display device 140, even when they are nowhere near the actual display device 140. This allows for remote curation of a cluster of display devices 140.

In one embodiment, once the user sets up a frame that satisfactorily covers all interested display devices 140 within its Field of View (FOV) and tracking has been initiated to draw the above mentioned overlays, several types of information can be obtained with this tracking data:

a) The dimensions and aspect ratio of each display device 140;

b) The current orientation of each display device 140 (portrait or landscape);

c) The relative sizes of display devices 140 with respect to each other;

d) The position and orientation of display devices 140 with respect to each other (in other words, the gap between them);

e) The distance of the electronic device 120 and hence the user from the each display device 140 and the plane/wall on which the display devices 140 are mounted; and f) The relative orientation of the user with respect to each display device 140 and the plane/wall on which the display devices 140 are mounted.

This rich list of information listed above provides the visual app 129 to add interesting capabilities and functionalities to display device 140 control, configuration and content curation.

In addition to tracking the display devices 140, in one embodiment users may also supply ambient information through any of the following options:

Stepping back or widening the FOV to include more of the ambient information in the room;

Perform a separate pass, where the user captures just the ambience, taking a photo of the part of the room or object that they would like to be representative; and Perform a separate pass, where the user performs a movement/rotation to capture a stitched 360-degree image of the room, to be used for ambience calculations.

As seen in FIG. 4A, three display devices 140 are hung on the wall. In this example, the three display devices 140 are in different shapes and sizes. It should be noted, however, that display devices 140 may assume the same shape or size, take various shapes or sizes, or additional display devices 140 or less display devices 140 may exist to form specific layout combinations. Each display device 140 displays content, which is either the factory default if the display device 140 has never been configured, or a user supplied content recorded by the pattern library through previous content management of the display device 140.

In one embodiment, with the ambience information captured, it is possible to assess certain details of the ambience, such as color of the walls, lighting in the room, the color spectrum of all of the images shown in neighboring display devices 140, etc. In one embodiment, the application running on electronic device 120 switches between two-dimension (2D) and AR mode. In one example, 2D mode allows for regular 2D interactions necessary for operations such as browsing image galleries and typing, etc. The AR mode loads the AR library and provides a camera view that is used to look at and interact with display devices 140. In one embodiment, when the AR mode is turned on the electronic device 120, the display devices 140 switch to a content that is conducive to one of the image based tracking technologies described above. In one embodiment, the displayed content may take the form of a pre-determined frame marker, watermarking etc., that is unique to that display device 140. In another embodiment, the currently displayed image itself might serve as an image target and for tracking. The electronic device 120 is constantly communicated with the state of all display devices 140 and is correspondingly loaded with the right pattern recognition dataset.

Figure 4B:
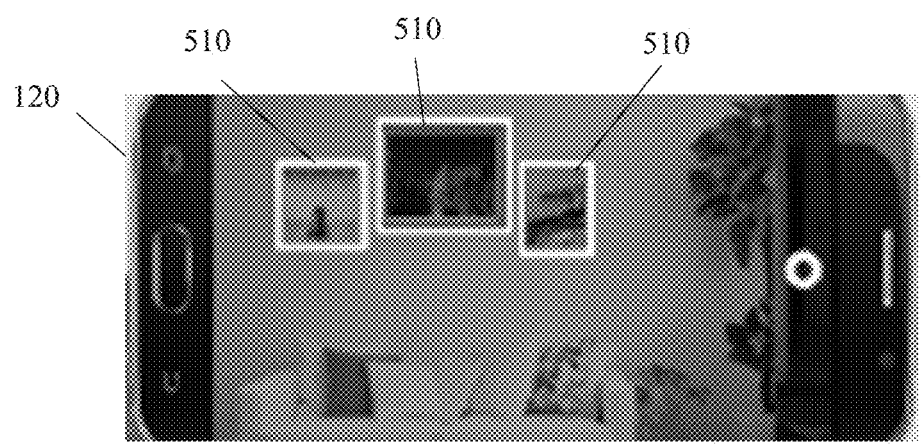
FIG. 4B shows a mobile device capturing a layout of the cluster of multiple display devices, according to an embodiment.

FIG. 4B shows an electronic device 120 capturing a layout of the cluster of multiple display devices 140 of FIG. 4A, according to an embodiment. As shown, the electronic device 120 captures the layout of the display devices 140 of FIG. 4A and provides an overlay 510 over each of the captured displays 410. As the user points the camera 128 to the displays 410, the electronic device 120 starts the pattern matching process described above to recognize each one of the display devices 140.

In one embodiment, instead of solely relying on content recognition, the electronic device 120 is able to distinguish one display device 140 from another based on the LEDs embedded around the frame, edge or border of the display device 140. For example, each display device 140 may have a unique LED lighting pattern. If there are X number of LEDs for each display device 140, the unique pattern can reach X power of 2. For another example, the LEDs may increase the unique pattern by controlling the on/off frequency, on/off sequence, etc. In one embodiment, the electronic device 120 only needs to distinguish one display device 140 from another within the same group of captured display devices 140. The same pattern can occur for another display device 140 as long as it belongs to a different group. This allows a smaller number of required unique patterns. The unique pattern may only need to present itself during a pairing process. In one embodiment, the pairing process includes loading the credentials for network communication such as Wi-Fi ID, BLUETOOTH® network etc., and its respective password onto electronic device 120 and transferring the same to a display device 140 via technologies such as NFC. Once display device 140 receives these credentials, it is then live on the wireless network, enabling wireless communication between electronic device 120 and display device 140 henceforth. Once the display device 140 is paired with the electronic device 120, the identification of the display device 140 is associated with the corresponding virtual overlay as described above.

In one embodiment, when multiple display devices 140 are recognized, the visual app 129 identifies the region or pixels of each of the recognized display devices 140 in the image captured by the electronic device 120. In one example, a box region (overlay 510) is created for each recognized display device 140 corresponding to the identified region or pixels, and represents the corresponding virtual object. These box regions remain associated with the corresponding display device 140, and each maintains the aspect ratio most suited for the display capability of the corresponding display device 140.

FIGS. 5A-F show a sequence diagram for an example of managing the image content displayed on the cluster of multiple display devices 140, according to an embodiment. In FIGS. 5A-F, three displays are shown, display 640, 641 and 642, all which are similar to display device 140 as described above. In FIGS. 5A-5D, image content 651 is displayed in display 641. In one example, the user can use the same control means as described above to upload content into desired display 641. For example, by dragging a picture from an on-device album or gallery 630 to one of the box regions shown on the electronic device 120. FIG. 5D shows dragging 661 from the album or gallery 630 to the box region associated with display 641. In FIG. 5E the image dragged from the album or gallery 630 is now displayed on display 641 as image content 652, which replaced image content 651. FIG. 5F shows the resulting wall of displays 640, 641 and 642.

FIGS. 6A-D show a sequence diagram of an example for managing the image content 711 displayed on a display device 701 by adjusting scale, according to an embodiment. Users today have a large number of images in their collection. These images (e.g., photos, videos, etc.) are often taken with varying devices such as digital cameras, smartphones etc. In addition, they also receive/have access to images from various social platforms and services such as FACEBOOK®, INSTAGRAM®, PINTEREST®, SNAPCHAT®, etc. It would be expected that the user would like to share any of these images on their display 701 (similar to display device 140 as described above). Unfortunately, these images can come in various dimensions and aspect ratios and might not match 1:1 with the aspect ratio of the intended display 701.

Auto cropping mechanisms such as center cropping the image on dropping to fit the display's 701 aspect ratio do not provide satisfactory results as region of interest in the image could be anywhere within the image and center cropping could cut out information or present them in an unflattering manner. Manually having to figure out the aspect ratio of the image, go into a third party app and perform cropping is tedious. Since the modular displays are always networked and constantly communicate with each other the details such as physical details and state, it is possible to know when the image being dropped on to a modular display will not match. In one embodiment, as shown in FIG. 6A on release of dragging an image content 720 from the album or gallery 630, a new pop up 730 appears as shown in FIG. 6B. The new pop up 730 shows the dragged image 720 along with a rectangle in the aspect ratio (the ratio of the width to the height) of the display that the user has dragged to. The user can then move and scale the box (with aspect ratio locked) until it best fits the regions the user would like to display. On confirming, this subset of the image alone will show up in the display 701 as the adjusted image content 721 as shown in FIG. 7D.

In another embodiment, upon drag and drop and identifying a mismatch, the visual app 129 may also suggest another display device 140 in a group of displays that would be a better fit for this particular aspect ratio, so the user would not have to crop and compromise the look and feel of the image. This recommendation to use another display device 140 may also be based on other parameters such as colors of neighboring display devices 140, motion of the content, resolution and other features. For example, consider a scenario where a cluster of display devices 140 are arranged on an environment (e.g., a wall), such that the display devices 140 on the left side show images that are predominantly on the red color spectrum and the display devices 140 on the right side show images that are predominantly on the blue color spectrum. An image is dragged and dropped that is predominantly orange in color, on to a display device 140 on the right side, the orange would appear glaringly out of place among the display devices 140 with predominantly blue images. One or more embodiments perform an analysis and suggest that the image might best be placed in one of the display devices 140 on the left for a visually pleasing effect. The user may then choose to select the recommendation or ignore it if they intended to have such a contrasting look (e.g., for creative reasons).

One or more embodiments provide for remotely managing the image content displayed on a display device (e.g., display device 140), according to an embodiment. In one embodiment, a wall may include several display devices 140. In one embodiment, when a user captures an image of the display devices on the wall with an electronic device 120, the image also captures the contextual information surrounding the display devices, such as other wall decorations (e.g., surrounding furniture, color contrast among the fixtures, plants or other environment settings, etc.), which is then saved as a virtual wall. The contextual information available in these virtual wall images may improve the flexibility of user interaction with the modular devices. For example, the user may stay in her bedroom to manage the content of the modular devices in the living room. The virtual wall, which is a visual snapshot of a cluster of display devices 140, can also be thought of as a list of network addresses such as an IP address embedded spatially within the snapshot. With the network address in hand, the respective display device 140 can be controlled from anywhere within the home. If the internal network is connected to external networks such as the Internet, the user has the ability to curate these display devices 140 from remote locations. Alternatively, another user that has access to the network address of the display devices 140 but is located remotely, can also curate the display devices 140.

The user may use one or more virtual walls to manage the content display changes when she is on vacation, for example in the Caribbean (this example may require a home hub that can interact with the electronic device 120 so that the electronic device 120 can identify the specific modular display device to the hub, and through the hub to complete the content management). Alternatively, this can also be achieved via the cloud, if the multiple display devices are connected to the internet via technologies such as Wi-Fi.x1. The context information in these virtual walls allows her to not only view the content that will be displayed on each individual modular device, but also the overall effect of the content display in view of the surrounding setting. In this example, the user is able to save these virtual walls and categorize them with representative names such as hallway, guest room, living room, etc.

In addition to the above, users can share their virtual walls with friends, so they can briefly allow their friend to curate their photo wall. Alternatively, users can dedicate specific displays to certain friends, allowing them to curate that display. An example would be a mother dedicating a display to her daughter who is away at college. The daughter has access to this display and constantly updates it with her favorite images, to inform her mother of her life activities. This can provide for some fun and intimate interactions.

In one example, the image content is selected from an album or gallery. The user is able to drag and drop selected image content onto an overlay associated with a selected display device located on the wall. Upon release of the image content, the image content is now displayed on the selected display device.

Figure 7A:
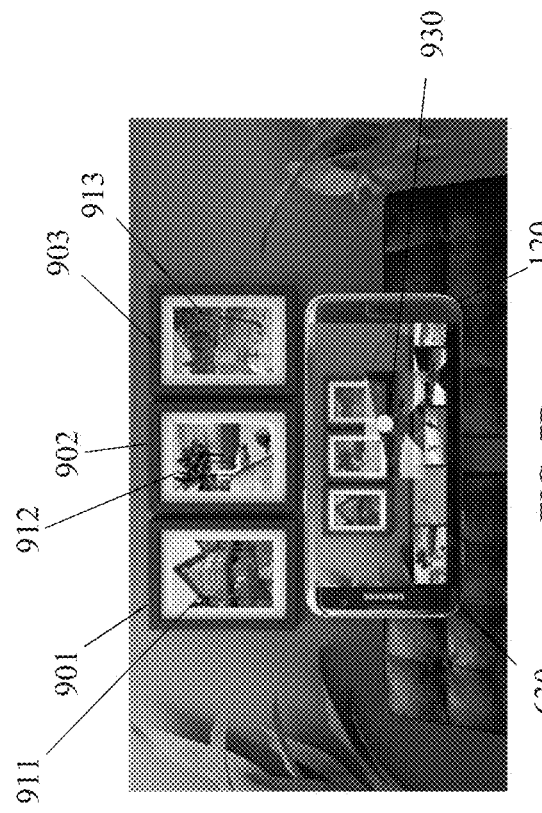
FIGS. 7A-D show diagrams of an example for managing the image content displayed on multiple display devices by spreading a single image content across the multiple display devices in a spatially cohesive manner, according to an embodiment.
Figure 7B:
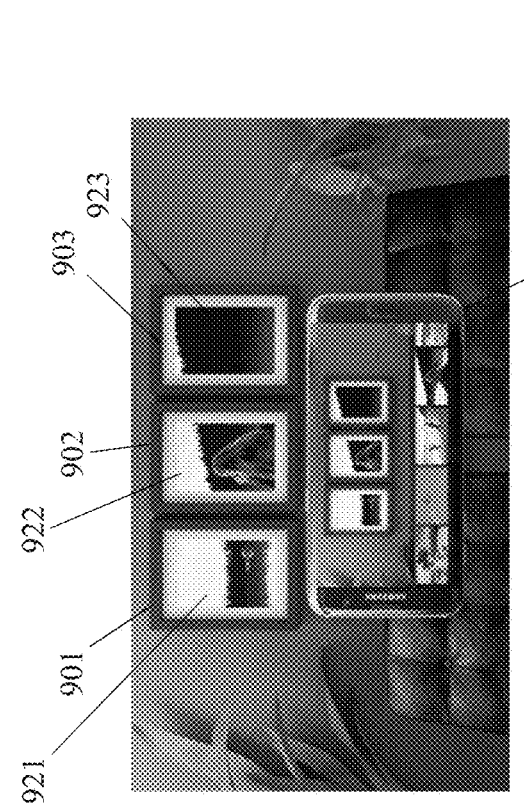
Figure 7C:
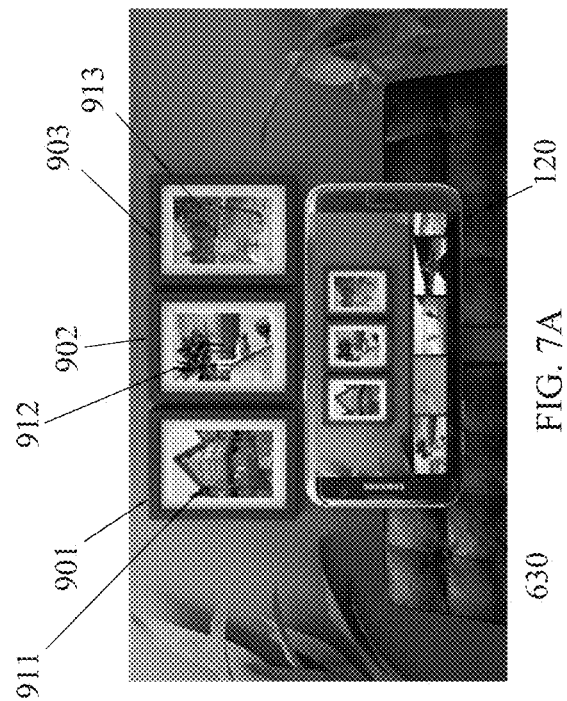
Figure 7D:
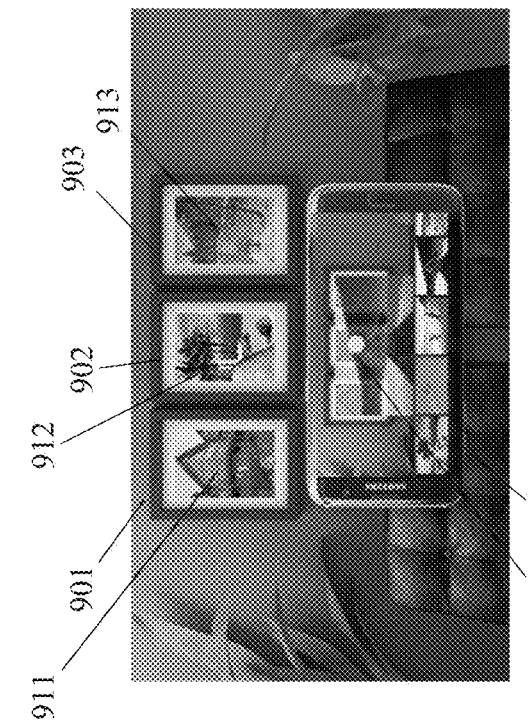

FIGS. 7A-D show diagrams of an example for managing the image content displayed on multiple display devices by spreading a single content across the multiple displays 901, 902 and 903 (similar to display device 140 as described above) in a spatially coherent manner, according to an embodiment. In one example, image content is spread across the displays 901, 902 and 903 in a spatially coherent manner. FIG. 7A shows a captured image of a layout of the displays 901, 902 and 903 on an electronic device 120 with an album or gallery 630 available for content management and control. The displays 901, 902 and 903 each show image content 911, 912 and 913, respectively. To spread an image across the displays, the user needs to perform 3 steps: a) first a menu option is selected, expressing intent to enter into this mode; b) the virtual overlays of displays 901, 902, 903 are then tapped to let the system know that it is across these chosen displays that it is desired to spread an image; c) an image may then be dragged and dropped onto the virtual overlays of any one of the selected displays. Each display is then sent a message to load the image of interest along with the texture coordinates valid for that particular display, which the display uses to ensure it displays only the portions of the image that it is supposed to. Texture coordinates are pairs of values used to indicate a specific sub-region of an image. The texture coordinates may be used to communicate the exact four points on an image of a display device 901, 902 and 903, the pixels within which a display device needs to render. Depending on the relative positions of each of the displays 901, 902 and 903 with respect to each other and with respect to the electronic device 120, their aspect ratios and physical dimensions, each display 901, 902 and 903 will be calculated to subtend a particular sub-region of the image to be displayed and thereby the corresponding texture coordinates. The physical analogy would be to take a large print of a photo and then overlay it on top of a few picture frames and figure out which regions of the photo actually fall on top of which picture frames, cut them out, drop them into the respective picture frames, and discard the rest of the photo.

In FIG. 7B, a user selects an image from the album or gallery 630 that she wants to be displayed across the displays 901, 902 and 903 simultaneously, and drags 930 the selected image and drops it onto one of the displays 901, 902 and 903 as shown in FIG. 7C. In FIG. 7D the dropped image gets spread across the three displays 901, 902 and 903 as image content 921, 922 and 923. This technique enables a solution to maintain the spatial relationship of the image content over the displays 901, 902 and 903. It may be observed that the slope of the hill in the image content 921, 922 and 923 is maintained. This would not have been the case if spatial relationship of frames had not been taken into consideration.

FIGS. 8A-D show diagrams of an example for managing the image content displayed on multiple display devices by overlaying on top of a selected image content during the content selection process so that the image content is cropped over a whole group 1000 of display devices including the spaces among them, according to an embodiment. FIGS. 8A-D provide an extended example of the concept shown in FIGS. 7A-D with nine displays. In this example, instead of dividing the selected image content 1030 into nine parts according to the shape and size proportionally, FIG. 8C illustrates that the display devices overlay on top of the selected picture during the content selection process so that the image content is cropped over the whole group 1000 of the display devices, including the spaces among them. The user, thus, may understand how the image content will look like when it is displayed across the devices in the group 1000. Note that each box region in the group of box regions 1040 of FIG. 8C contains a part of the image content 1030. Moreover, all of the box regions altogether cover only a partial image of the selected image content 1030. FIG. 8D illustrates how the selected image content is displayed by the multiple display devices with the display device 1001 showing its cropped image content 1041. Note that the display devices display only the parts of the image that were overlapped in the corresponding box regions in FIG. 8C.

In one embodiment, a user has the option to more flexibly adjust how the selected content will be displayed on each of the display devices. For example, via gestures such as slide (move up, move down, move left and move right), rotate, scale and crop, the selected image content 1030 changes its position, orientation, scale and boundaries relative to the group 1040 of the box regions (the relative positions of the box regions are fixed with respect to each other). In one example, the group 1040 of box regions remains still as the user manipulates the selected image content 1030 around those fixed box regions. The selected image content 1030 then populates into those fixed box regions as desired. This allows the user to fit the most interesting content in the best way possible, to their liking.

Figure 9A:
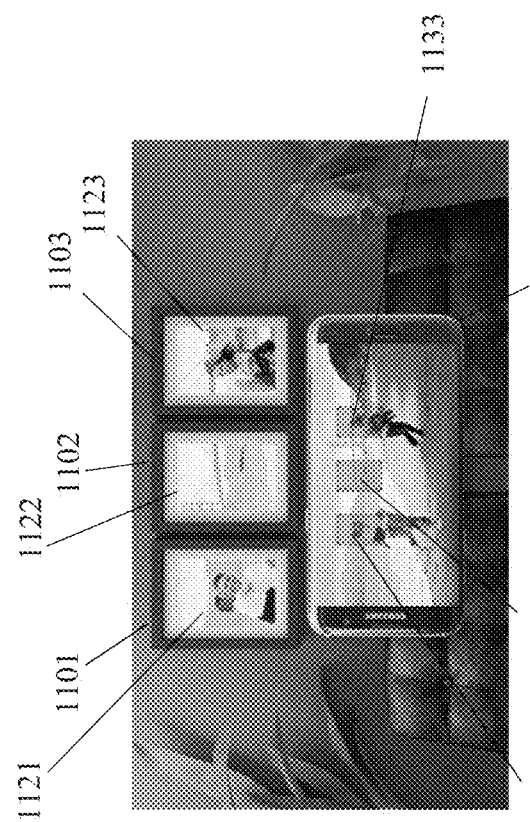
FIGS. 9A-F show diagrams of an example for managing the image content displayed on display devices by spreading a single image content across multiple display devices based on regions of interest, according to an embodiment.

FIGS. 9A-F show diagrams of an example for managing the image content displayed on display devices 1101, 1102 and 1103 by spreading a single content across these multiple display devices based on regions of interest, according to an embodiment. In one example, a technique for spreading a single content across multiple display devices 1101, 1102 and 1103 is based on the box regions (of interest) 1131, 1132 and 1133. FIG. 9A shows the display devices 1101, 1102 and 1103 secured onto the wall and a captured image of them on an electronic device 120. The display devices 1101, 1102 and 1103 are currently showing image content 1111, 1112 and 1113, respectively.

Figure 9B:
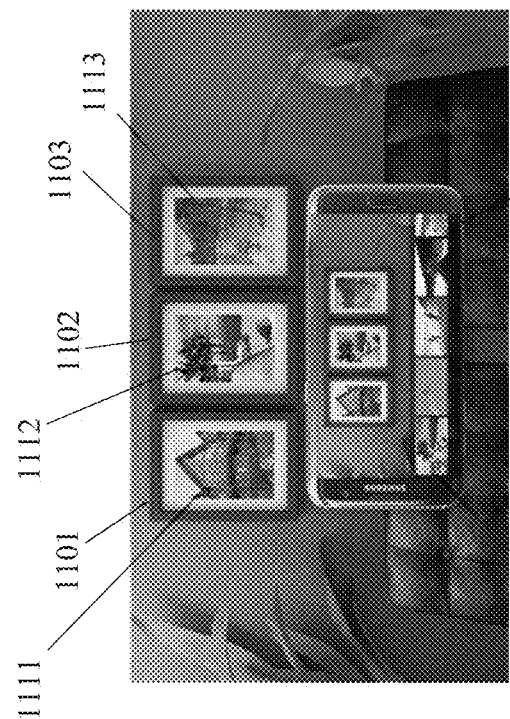

The user selects image content from an album or gallery 630 that she wants to be displayed across these display devices 1101, 1102 and 1103 simultaneously and drags and drops it into any one of those displays shown on the electronic device 120. FIG. 9B illustrates an initial view of how the selected image will be displayed across the display devices 1101, 1102 and 1103 as image content 1121, 1122 and 1123, based on the original box regions 1131, 1132 and 1133. As illustrated by FIGS. 9B-F, only the part of the selected image that falls within a box region will be displayed.

Figure 9C:
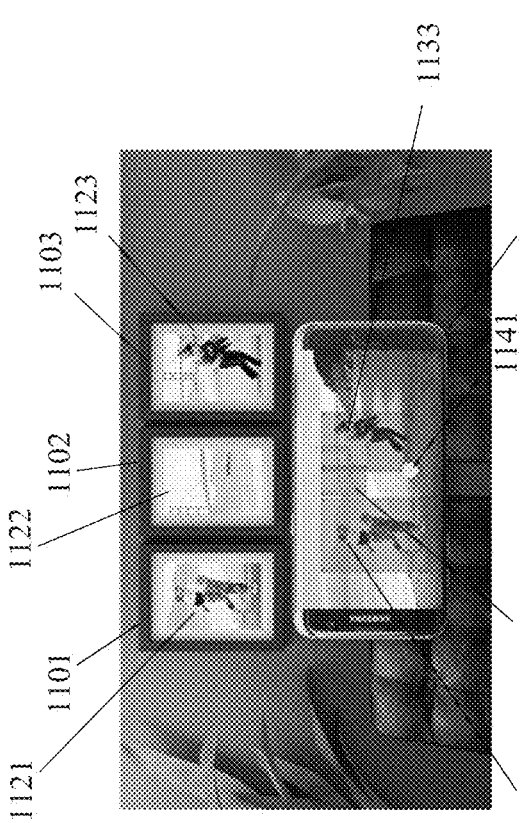

In FIG. 9B, the body of the people in the selected image content are not correctly/fully included in any of the box regions 1131, 1132 and 1133. One or more embodiments provide the ability to upload the most desired portion of a selected image content into any of the display devices. Each box region is designated to a particular display and represents what pixels are drawn on that particular display. The aspect ratio of a box region is always locked to that of the display device it is assigned to (even when its scale changes, it maintains the aspect ratio). FIG. 9C shows that a user is able to select any of the box regions 1131, 1132 and 1133 and drag one of its corners 1140 to change the area that this box region covers.

Figure 9D:
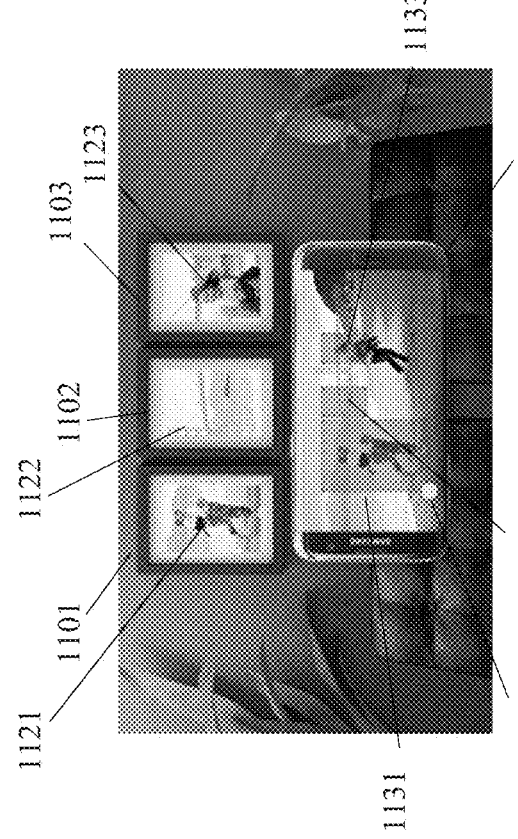
Figure 9F:
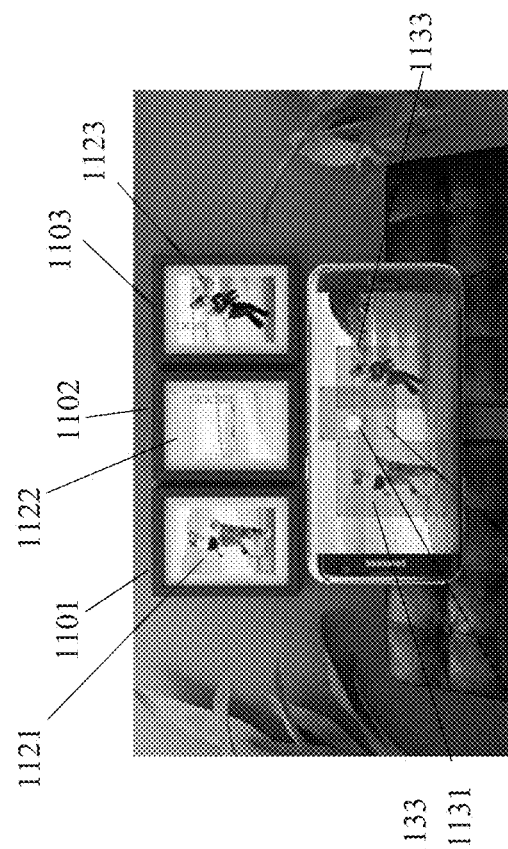
Figure 9E:
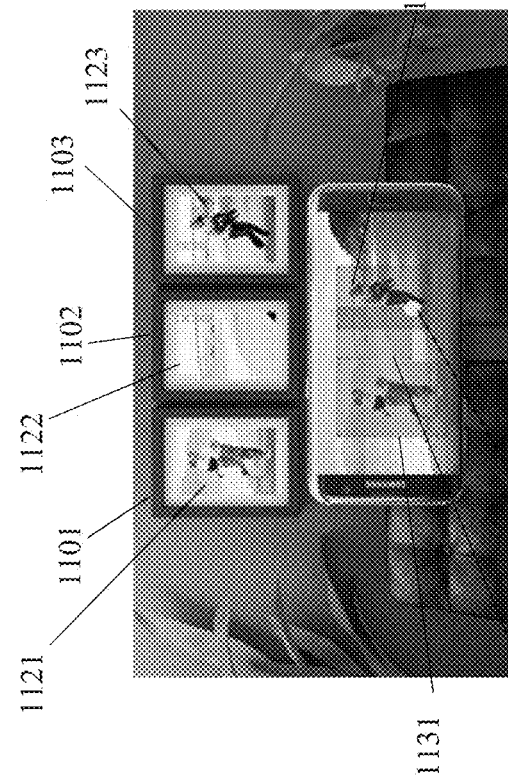
Figure 10B:
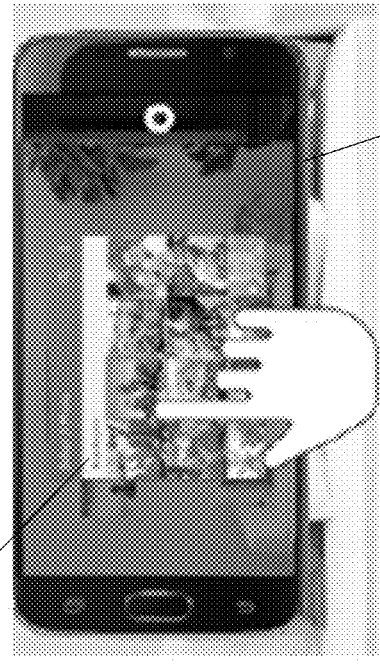
FIGS. 10A-D show diagrams of an example for managing the image content displayed on display devices by changing the relative relationship of the image content displayed on a display device, according to one embodiment.
Figure 10A:
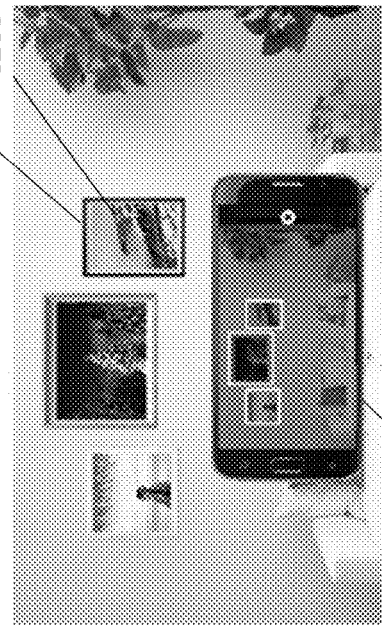
Figure 10D:
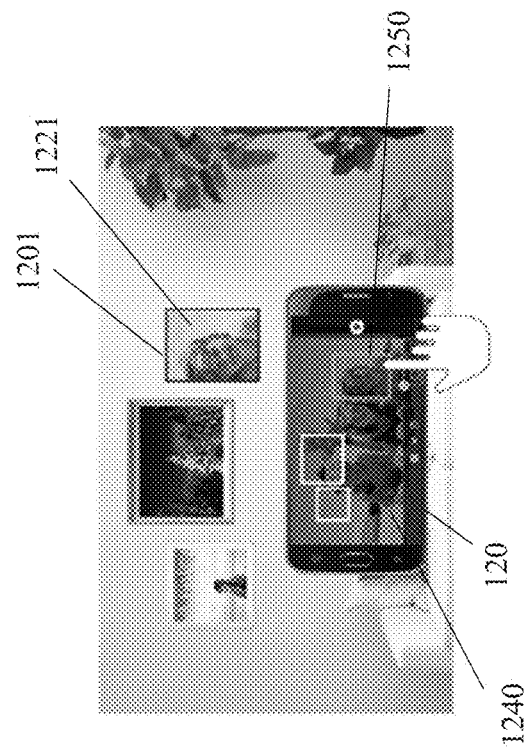
Figure 10C:
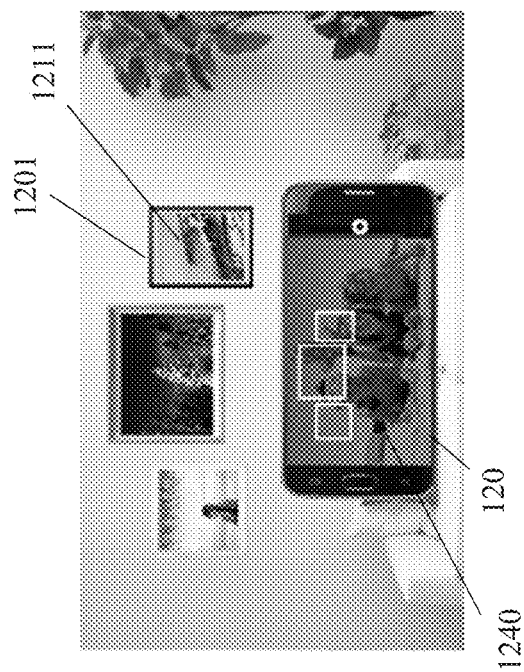

FIGS. 9D-E show how a box region can be moved so that it overlays the desired portion of the selected image content. As described above, a box region on the captured image is associated with a particular display device. When the box region has its corners 1141 dragged, moved or scaled, the process tracks the changes and records the new position of the box region without losing the display device association. FIG. 9F shows the final result of such operation that each display device 1101, 1102 and 1103 is able to display the exact portions 1121, 1122 and 1123 of the selected image content, as designated by the user via the electronic device 120.

FIGS. 10A-D show diagrams of an example for managing the image content displayed on display devices by changing the relative relationship of the image content 1211 displayed on a display device 1201, according to one embodiment. In one example, the visual app 129 provides the ability for a user to change the relative relationship of the image content displayed on the display devices. In one embodiment, the user is able to move a box region corresponding to a display device on the right side to overlay on any part of the selected image 1240 (selected from the album or gallery 1230 in FIG. 10B). For example, the display device 1201 on the right may display an image of the kid on the right side of the selected image 1240. The user is also able to scale the size of the box region 1250 to adjust the portion of the image content that will be actually displayed on the corresponding display device 1201. This allows the user to change the ratio of different aspects of the image content displayed by the display devices, with respect to the overall selected image 1240. In another embodiment, a small inset image is shown that showcases the original alignment of each box with respect to the image content that serves as a reference for the user. Once the box region 1250 is dragged to the portion of the selected image content 1240 as desired (and adjusted for scaling), the final image content 1221 is displayed on the display device 1201 in FIG. 10D.

FIGS. 11A-F show a sequence diagram of an example for sharing image content shown in any of the multiple display devices, according to one embodiment. FIG. 11A shows eight display devices (similar to display device 140). In FIG. 11B a captured image of the display devices (including display device 1301 showing image content 1311) is shown on the electronic device 120, along with an album or gallery 1330. Similarly as a user may drag and drop an image content from the electronic device 120 on to a display device with an overlay, they may do the opposite as well in order to save or share the image content. In one example, a user may point their electronic device 120 to a display device and obtain access to the original image content (e.g., image content 1311 on display device 1301) displayed in the display device for purposes such as saving, sharing and swapping.

Typically, if a user would like to share an image/video that is currently displayed in one of the display devices with a friend, they would need to navigate through the plethora (e.g., 100 s, 1000 s) of photos in their mobile device to search, identify, attach to a message or email and share it with another user. In one embodiment, using an AR technique, the visual app 129 identifies the photo/video, links directly to the local copy stored in its gallery or album and makes it available immediately for further operations, such as sharing with a friend, sharing with another mobile app, etc. The AR tracking here works analogous to shortcuts on desktop computers.

The network lookup table described above along with virtual overlays is useful in identifying a display based on its currently displayed image. The same look up table may also be used to obtain the original image that a particular display device 140 is currently displaying. When the user directly touches a virtual overlay associated with a display device 140, the system then uses the network address associated with the display on the look up table to retrieve the path to the image that the display is currently showing. Once this path is retrieved, the system can proceed to do any number of operations with it. In FIG. 11B the box region 1320 is selected by a user. In FIG. 11C the selected image content 1311 in the box region 1320 is dragged to the share portion 1340 of the display on the electronic device 120 as shown in FIG. 11D. In FIG. 11E, a selection graphic 1350 (e.g., a window, a pop-up, etc.) is displayed with the selected image content 1311 providing options for sharing, forwarding, saving, etc. (e.g., via text message, email, messenger, saving to a gallery or album, social media platform, etc.). In one example, the user selects to share the image content 1311 in a text message, and FIG. 11F shows a text message display 1360 with the image content 1311 that may be forwarded to others as desired. In another example, the user may select the image content 1311 in the box region 1320 and drag the image content 1311 to a portion of the display on the electronic device 120 such as the gallery or album, a favorites selection, etc. for saving the image content 1311 as desired.

Figure 12B:
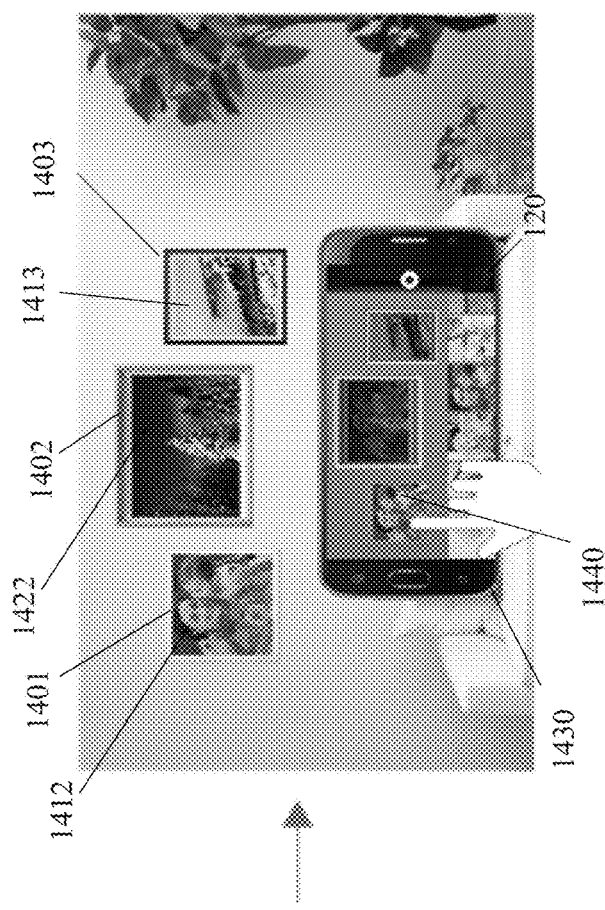
FIGS. 12A-B show an example illustration of finger movement drag and drop for moving image content between display devices, according to one embodiment.
Figure 12A:
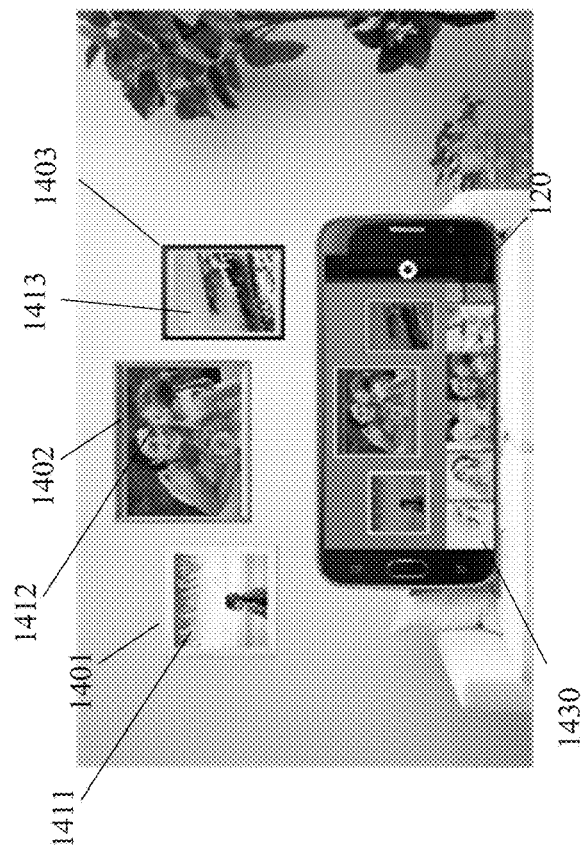

FIGS. 12A-B show an example illustration of finger movement drag and drop for moving image content between display devices 1401, 1402 and 1403, according to one embodiment. In one example, display devices 1401, 1402 and 1403 are displaying image content 1411, 1412 and 1413, respectively. In this example, a user desires to move the image content 1412 in the display device 1402 to the display device 1401. The user may grab the image content in the box region 1440 shown on the electronic device 120 by dragging and dropping it on to the desired display, in this example the box region associated with display device 1401. This way, the user may swap and reorganize the same set of images among the cluster of display devices, without having to reach into their gallery or album 1430. The result is shown in FIG. 12B where the content image 1412 is shown in display device 1401. In one example, another image content 1422 takes the place of the moved image content 1412. The image content 1422 may be a default image, a next image in the gallery or album 1430, a previously displayed image content (e.g., the last displayed image content or a shuffle selection) recorded by the display device, etc. In another embodiment, the content 1422 might be the same as 1412 i.e., a simple swap of images happens between displays 1401 and 1402.

Figure 13B:
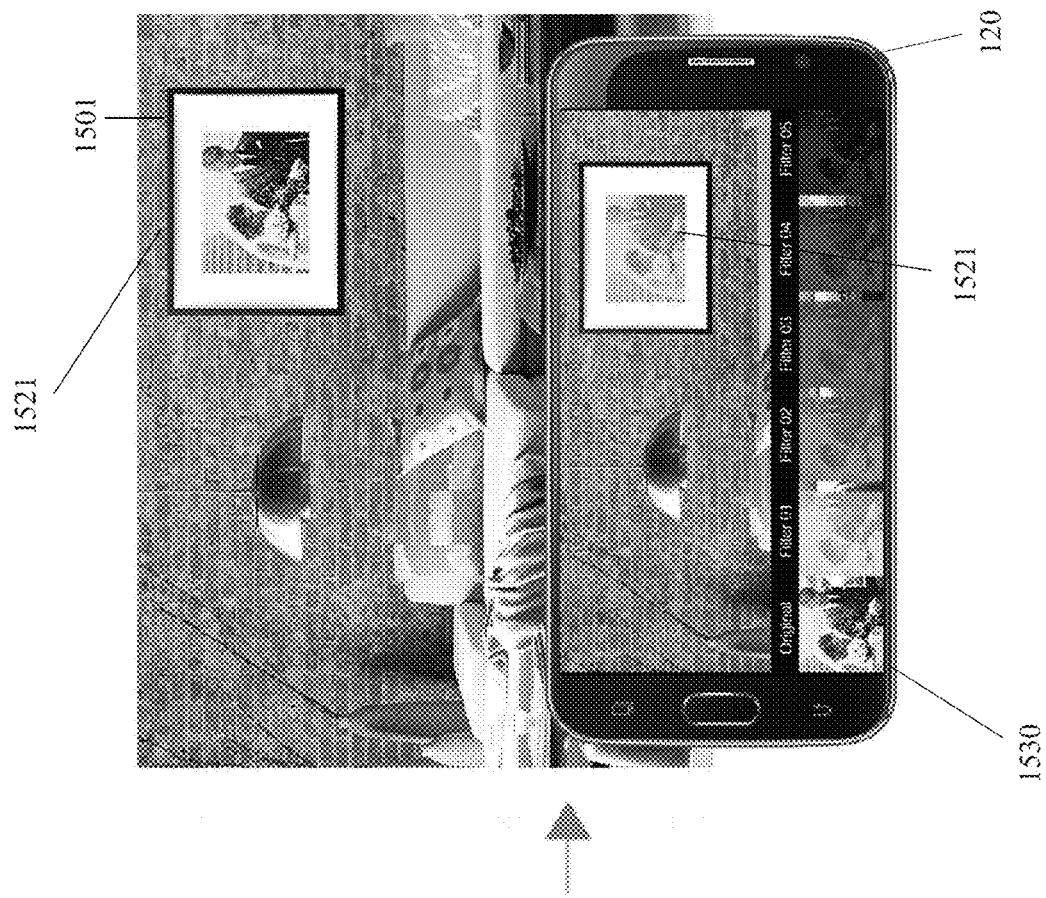
FIGS. 13A-B show an example illustration of finger movement drag and drop for applying predetermined filters or filters based on ambient colors for display devices, according to one embodiment.
Figure 13A:
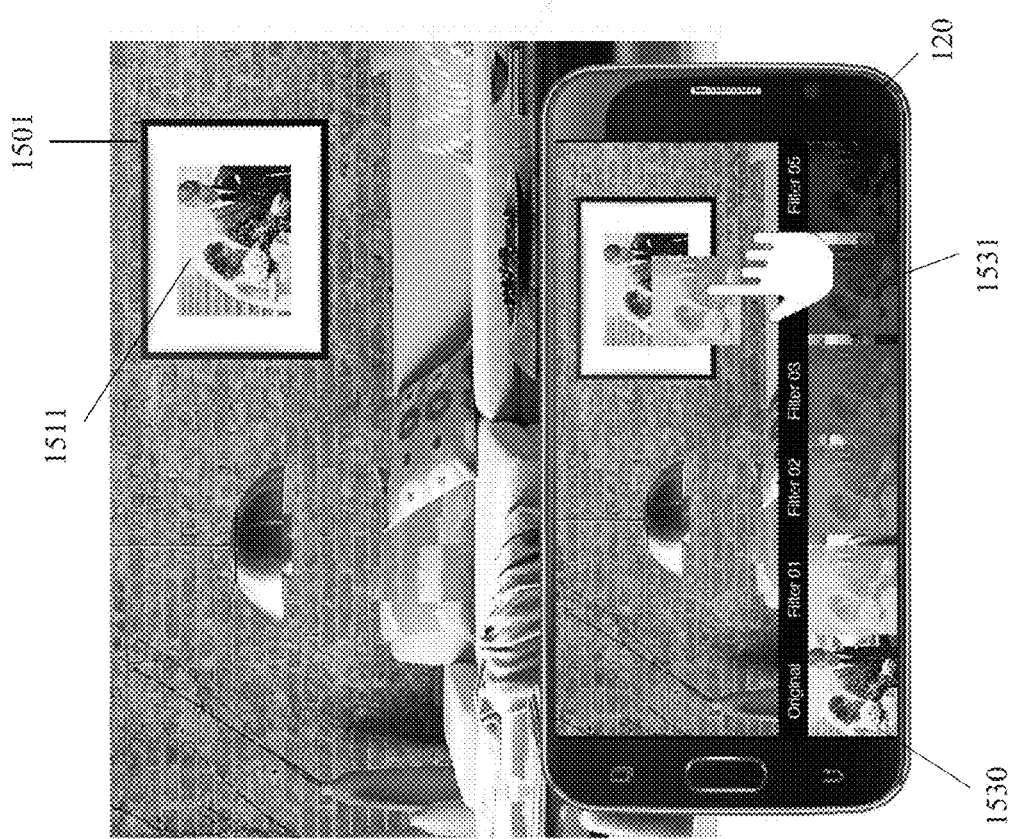

FIGS. 13A-B show an example illustration of finger movement drag and drop for applying predetermined filters or filters based on ambient colors for display devices, according to one embodiment. In addition to dragging and dropping image content on to a display device, the same technique may be used to apply effects on a particular display device. FIG. 13A shows an example, where the user points the electronic device 120 running the visual app 129 at the display device 1501 that is displaying image content 1511. Once the display device 1501 is recognized, the user can select an option from a list of image effects 1530 such as 'black and white', 'sepia', 'vignette', etc. and drop them on to the display device show in on the electronic device 120. The command is conveyed via the network and the intended display device applies the selected effect 1531 as updated image content 1521 shown on display device 1501 in FIG. 13B.

In one embodiment, the electronic device 120 also detects the color of the wall that the display device(s) (e.g., display device 1501) is(are) hung/attached to and the lighting color in the room—referred to as ambient colors. Considering the color scheme of the content image(s) showcased in the display device(s), and the color scheme in the ambience, the visual app 129 provides a recommendation for color filters, that can neutralize the overall color palette of the collection and allows them to blend into the room in a more visually pleasing manner.

Figures 14A, 14B, 14C:
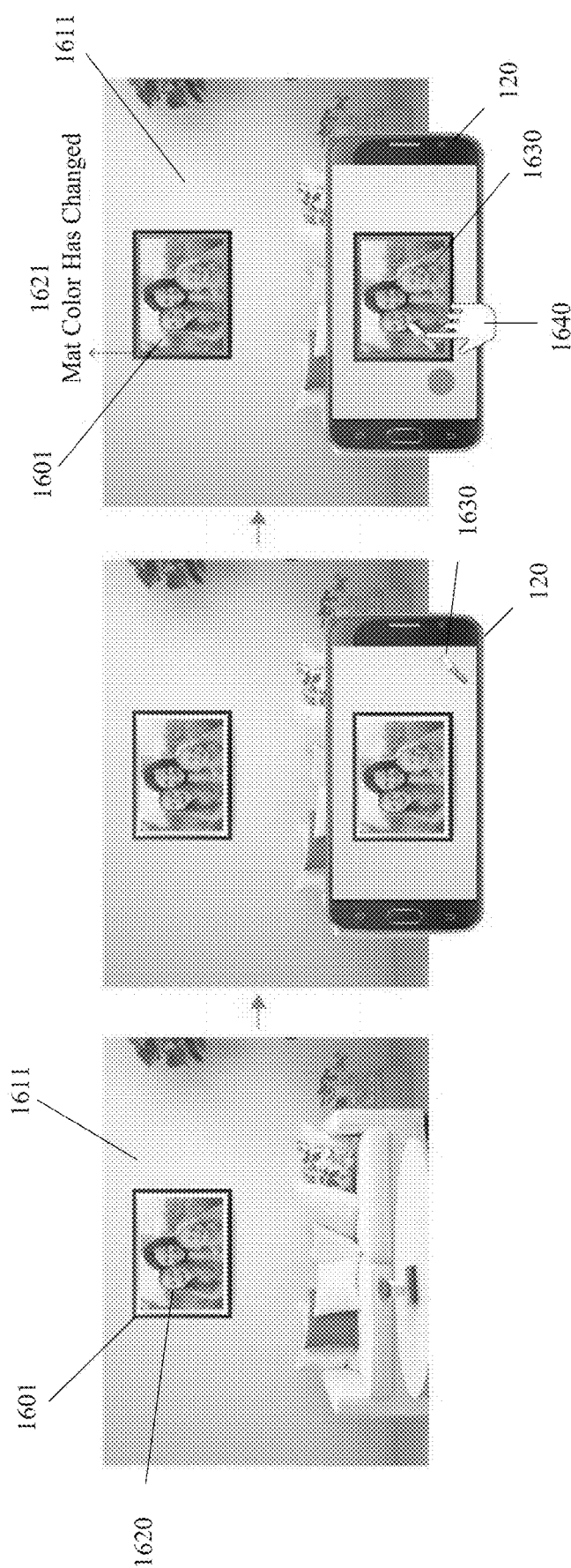
FIGS. 14A-C show an example illustration of selecting colors from the image content being displayed to be used as the mat color for display devices, according to one embodiment.

FIGS. 14A-C show an example illustration of selecting colors from the image content 1611 being displayed to be used as the mat color for display devices (e.g., display device 1601), according to one embodiment. Picture frames available on the market typically are provided with a mat. Mats usually serve the purpose of bringing attention to the displayed image content by providing a color relief and separation from the plethora of information surrounding the frame. These mats are mostly made of paper, but do also come in a variety of textures and colors. FIG. 14A shows a display device 1601 having a mat portion 1620 and image content 1611. In one example, it is desired to modify the mat portion 1620. In FIG. 14B the captured image content is shown on the electronic device 120. A graphic or icon 1630 is used to select a portion of the image content shown on the electronic device 120. In FIG. 14C the graphic or icon 1630 is dragged to a portion of the image content and a color representation (e.g., a graphic display of the color selected) 1640 of the color of the portion of the image content where the graphic or icon 1630 is placed is displayed. The image mat 1620 is then changed to mat 1621 to match the selected representation 1640 and displayed on the display device 1601.

Figure 15:
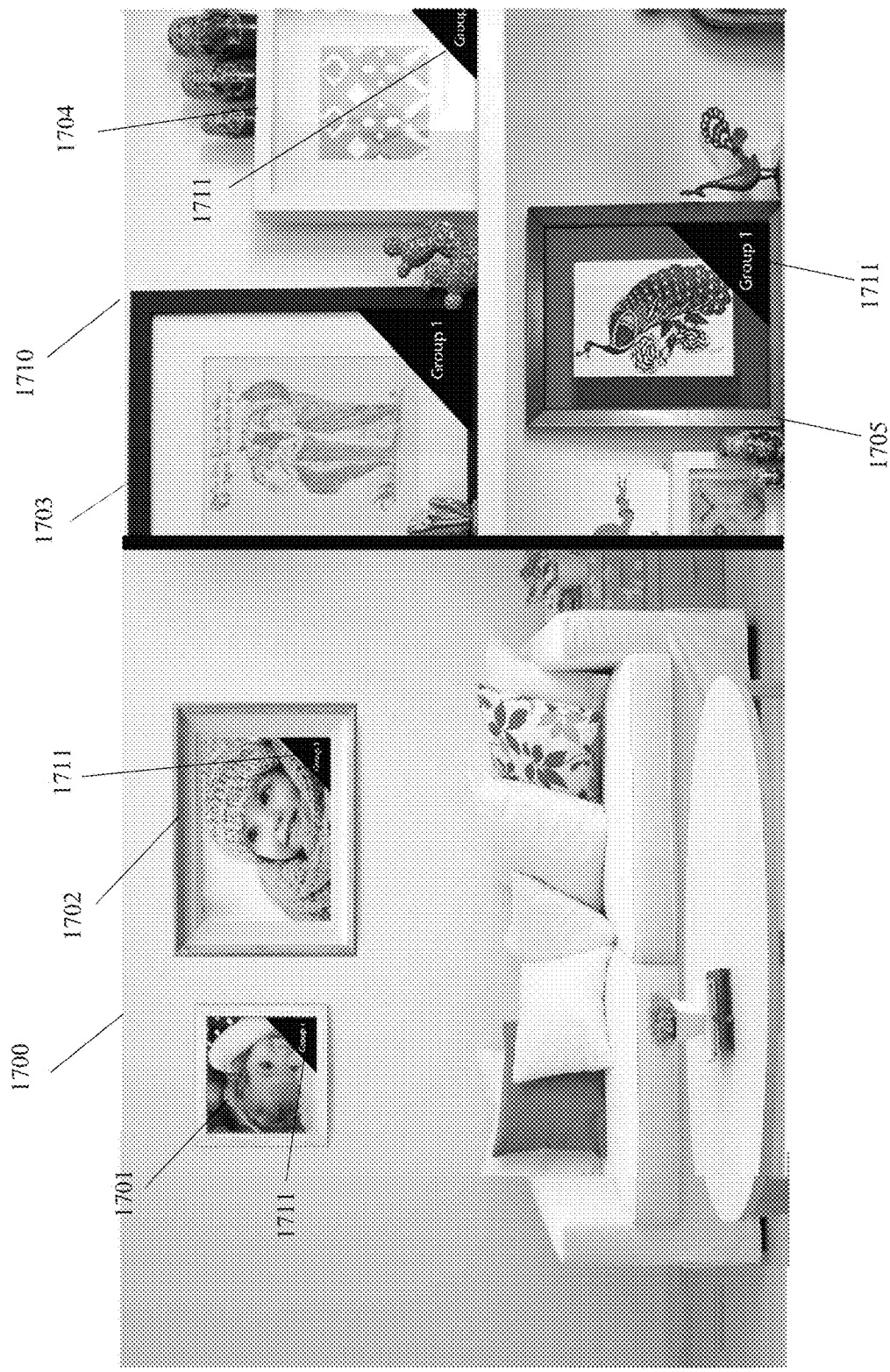
FIG. 15 shows an example illustration of grouping of display devices in multiple areas, according to one embodiment.

FIG. 15 shows an example illustration of grouping of display devices in multiple areas, according to one embodiment. The home of today may be filled with display devices (e.g., display devices 140) of varying shapes and sizes—television sets, digital picture frames, tablets, etc. These display devices are also typically set in different parts of the home. Especially when it comes to digital picture frames, people may prefer to decorate different regions of the home with images of different themes, albums, etc. In some cases, people also break down a cluster of picture frames into two or more themes. For example, image content on the wall 1700 in one room (e.g., a living room) in display devices 1701 and 1702, and image content on the right on wall 1710 in display devices 1703, 1704 and 705 in another room (e.g., a kitchen). Other scenarios such as certain image content on the left, center and right of a wall may have separate themes of image content. For example, boy's pictures on the left of a wall, family or parent pictures in the middle of the wall, and girl's pictures on the right of a wall. In such situations, there arises a need to group a set of display device.

In one embodiment, grouping display devices provides the following benefits:
 Provides interacting/ modifying with a group of display devices without disturbing another neighboring (or far away) group;
 Provides setting characteristics that apply to all display devices in a group—such as group effects/filters, slide show animation speed, etc.; and
 Provides curation of all display devices in a group with one quick interaction.

In the example shown in FIG. 15, the display devices 1701 and 1702 are set up as a group 1711 (e.g., a color or other indication may be associated with the group for easy visual recognition when captured on an electronic device 120 (FIG. 2)), and the display devices 1703, 1704 and 1705 are set up as a group 1712 (which would be another color or other indication to provide recognition). This clean distinction prevents any interaction on the living room (wall 1700) images to adversely affect the set of display devices in the kitchen (wall 1710) and vice versa.

Figure 16:
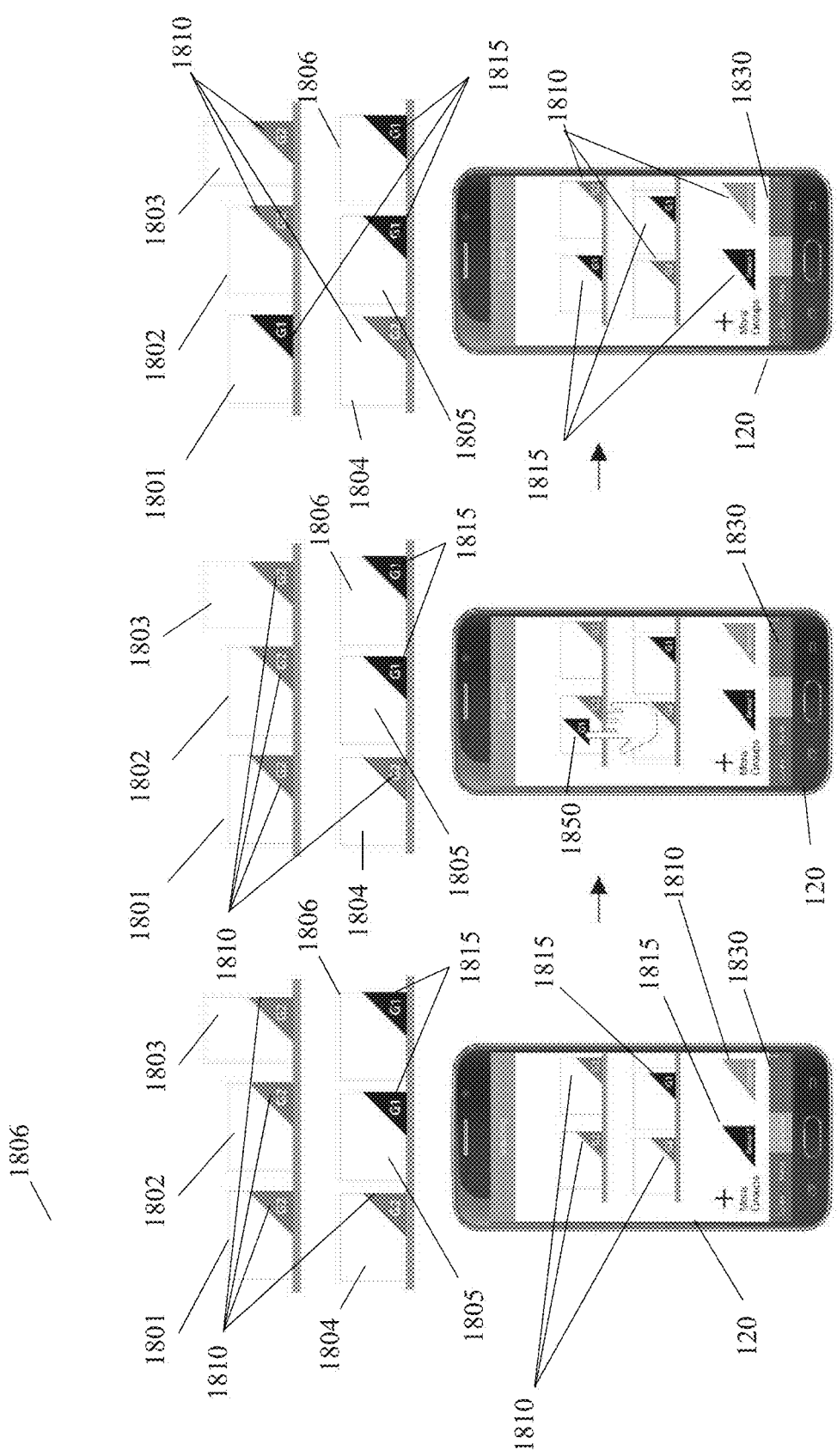
FIGS. 16A-C show an example illustration of managing groups of display devices using a mobile device, according to one embodiment.

FIGS. 16A-C show an example illustration of managing groups of display devices using an electronic device 120, according to one embodiment. There are several interaction opportunities for both the creation of display device groups and for modifying/curating them. In one example, users may use interactions to create the desired groups. FIG. 16A shows an example where a tray of indicators (e.g., colors) 1810 and 1815 shows up in the electronic device 120. The display devices 1801, 1802, 1803, 1804, 1805 and 1806 are desired to be placed into different groupings of 1810 and 1815. In one example, the group 1810 includes display devices 1801, 1802, 1803 and 1804. The group 1815 includes display devices 1805 and 1806. Users can select the grouping selection from selections 1830, point their electronic device 120 at a display device and drag and drop an indicator (e.g., a color) on to the represented or captured display device. On the electronic device 120, indicators (e.g., colors) for the two groups (1810 and 1815) are shown on the bottom portion of the electronic device 120, along with a selection for adding more groups.

In FIG. 16B a selection is made for changing display device 1801 from group 1810 to group 1815 using drag and dropping of the group 1815 indicator onto the representative image 1850 for display device 1801. FIG. 16C shows completion of the assignment of display device 1801 to group 1815. Upon completion, the display device 1801 is now assigned to group 1815 (e.g., an orange group). All displays assigned with the group 1815 indicator (e.g., orange color) will become part of the same group. Similarly, displays assigned with a group 1810 indicator (e.g., blue color) will all become part of the blue group. Users can select the plus (+) button on the left to create more such groups. Users may dynamically arrange and rearrange groups as they please. Any display device can at any time be made to:

Join a group;

Leave a group and join another group; and

Become its own island group, with just that display device within that group.

Group curation actions may in general be classified into four subsets: One-to-one; One-to-many; Many-to-many; and Many-to-one. The prefix denotes the nature of source selection on the electronic device 120, and the suffix denotes the nature of destination assignment on drop. The behavior and output of actions change based on which of the above modes that the user chooses.

One-to-one refers to the technique where a user may perform one action to influence one display device. For example, the drag and drop technique is used to apply a single image content to a single display device as described above is an example of a one-to-one interaction. Similarly, dragging and dropping a filter to apply to a single display would be one-to-one.

One-to-many refers to a technique used when a set of display devices are grouped. Users may perform familiar drag and drop actions to influence one action on all the display devices in a group. For example, to apply a filter effect to every display device in a group, a user may drag and drop the filter on to any display device in the group and the rest of the display devices in the same group will also be applied with the same filter.

Many-to-many refers to the technique when instead of selecting a single image content from an album and dragging it, if the user drags the album icon and drops it on to any display device in the group, all display devices in the group are automatically loaded with a random image from that album.

Many-to-one refers to actions, where multiple content/actions are assigned to a single display device. For example, users could drag and drop an album icon on to a single display device to influence just that display device, such that all images in the dragged album form a stack and the display device iterates through them with a slideshow.

In one embodiment, there is a clear need for ways in which users may express their intent to select/switch to any of those four grouping modes before/during their interaction to obtain desired effect/output. In one example, the user may in advance select the grouping mode for consecutive action to be made in one-to-one mode. Here the user selects, for example, a toggle button to switch to 'Single' mode and drags and drops a filter. As the user drags and hovers a black and white filter over a display in a blue group, only that particular display device highlights to show that it will be affected by this action. On drop, only that particular display device gets applied with a black and white filter.

In another example, a situation may arise where the user in advance selects the grouping mode for a consecutive action to be made in one-to-many mode. Here the user selects the toggle button to switch to 'Group' mode and drags and drops a filter. As the user drags and hovers over a black and white filter over a display in the blue group, all displays in the blue group highlight to show who will be affected by this action. On drop, all displays in blue group get applied with a black and white filter.

In yet another example, a user selects the grouping mode for consecutive action to be made during the drop interaction. As the user drags and hovers a black and white filter over a display device, the overlay splits into two halves/sub-menus, providing options between 'single' and 'group' mode. If the user drags and hovers over the 'group' sub-menu, all other display devices in the same group (e.g., a blue group), highlight to show which would be affected by this action. On the other hand, if the user drags and hovers to 'single' sub-menu, only that display device becomes highlighted. Depending on which of these two sub-menus the user drops the dragged filter to, the black and white filter is applied as one-to-one or one-to-many. Alternatively, the user may also select the grouping mode for consecutive action as they begin the drag operation. For example, as the user starts to drag a black and white filter, two sub-menus appear near the point of drag. One represents a 'group' action and the other represents a 'single' action. If the user drags the effect to either sub-menu, that particular sub-menu gets activated as the mode during drop. In FIG. 20A, the user drags and makes a first stop at single mode sub-menu, activating one-to-one curation, and then continues on to hover and drop the effect on a display, just affecting that display. If the user drags and makes a first stop at a group mode sub-menu, activating one-to-many curation, and then continues on to hover and drop the effect on a display device from the blue group, affecting all displays in the blue group.

There are several models of behavior possible within a group:

Albums may dictate group indications (e.g., color), that is there is a strict correlation between indication and albums. For example, all display devices showing pictures from a Christmas album have to be part of the red group. When a display device/or the group of display devices is assigned the beach album, they have to switch to becoming a blue group (e.g., the beach album is associated with color blue);

Display devices may be part of the same group, but do not necessarily have to show image content from the same album; and Follow everyone else in the group. For example, groups may retain their color and switch between albums, but all display devices in the group have to switch to the new album as well (i.e., all display device show the same album).

Figure 17:
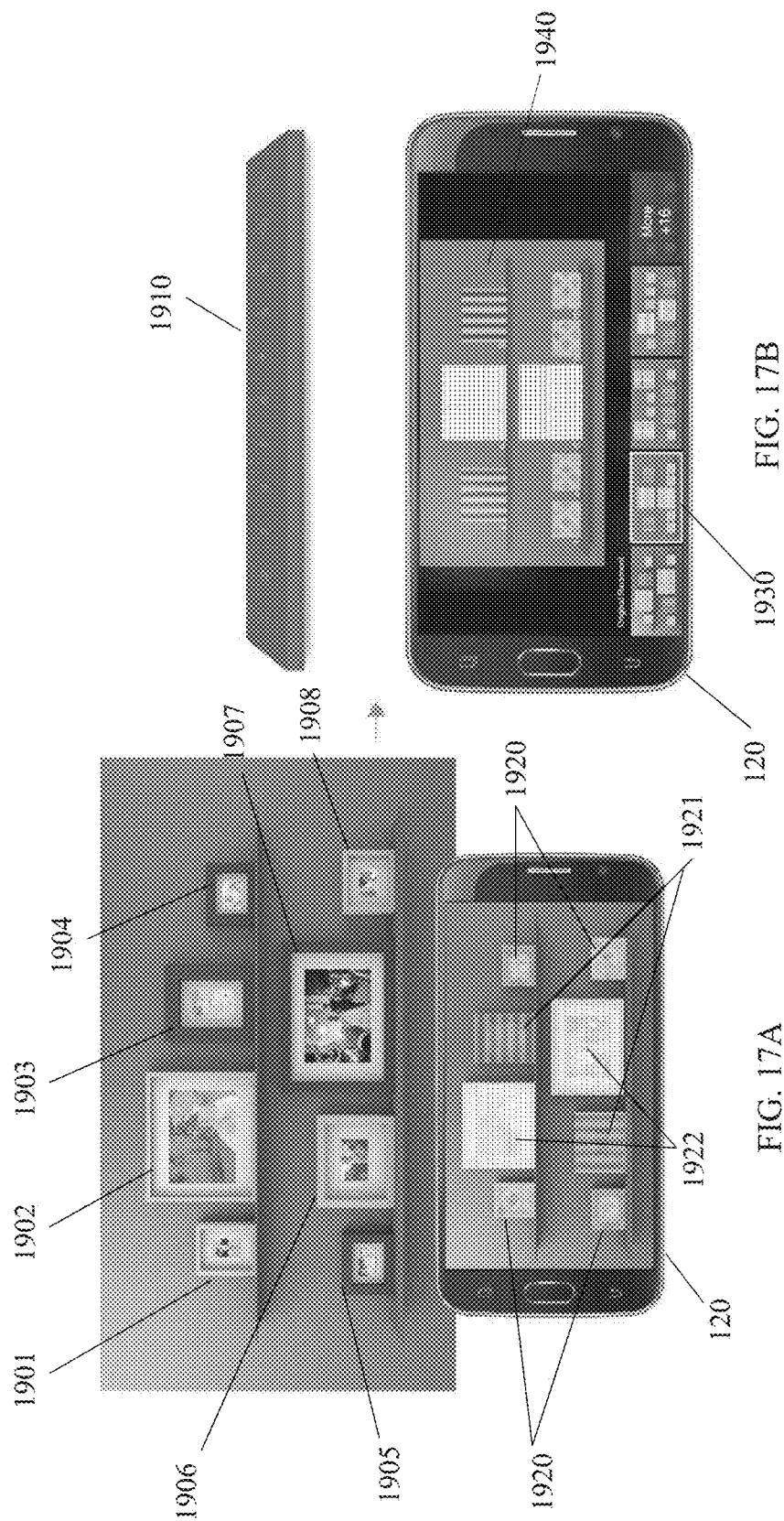
FIGS. 17A-B show an example illustration of an example template recommendation that measures the display devices and provides recommendations of various configurations for multiple display devices, according to one embodiment.

FIGS. 17A-B show an example illustration of an example template recommendation that measures the display devices and provides recommendations of various configurations for multiple display devices, according to one embodiment. A ledge, which is a horizontal bar affixed to the wall is used to mount the displays. Electronic device 120 already knows the details of the ledge, such as its dimensions, spacing of mounting slots etc., and when switched to ledge mode, takes these details into consideration for its calculations. As illustrated, FIG. 17A shows display devices 1901, 1902, 1903, 1904, 1905, 1906, 1907 and 1908 placed on shelves on a wall. In one example, in a ledge mode, the display devices may be found to not necessarily align well with each other. In one example, the electronic device 120 captures an image of the overall ledge layout. Each display device 1901, 1902, 1903, 1904, 1905, 1906, 1907 in the ledge mode is recognized through pattern matching, and is paired with the electronic device 120. In one embodiment, the electronic device 120 obtains the length and width of each display device during the pairing process. In one example, the length and width of each display may be gathered through a separate process. In one example, the pattern matching recognizes three patterns for the display devices 1901, 1902, 1903, 1904, 1905, 1906, 1907 as patterns 1920, 1921 and 1922 as shown in FIG. 17A.

As the size of the ledge is fixed and known to the electronic device 120, with the knowledge of the total number of display devices, and the size and shape of each, the electronic device 120 is able to make recommendations of how to place the display devices in the ledge mode to the user.

Each assembly manner is referred to as a template. As illustrated in FIG. 17B, every template shows several numbers. Inside the frame of the ledge, there is marked measurement 1910 that the user can place (unless pre-installed) and follow the numbers provided in the template to place the display devices. As shown, the templates may be selected from a template selection portion shown on the electronic device 120. In FIG. 17B, the template 1930 is selected and the outline of the display devices based on shape are displayed in display 1940 along with the numbers representing positions or distance/measurement according to the marked measurement 1910. The user simply places the display devices based on size/shape at the number on the marked measurement on each ledge according to the template. This assists the user in arranging the display devices (e.g., display devices 1901, 1902, 1903, 1904, 1905, 1906, 1907) on the ledge or shelf.

Figure 18:
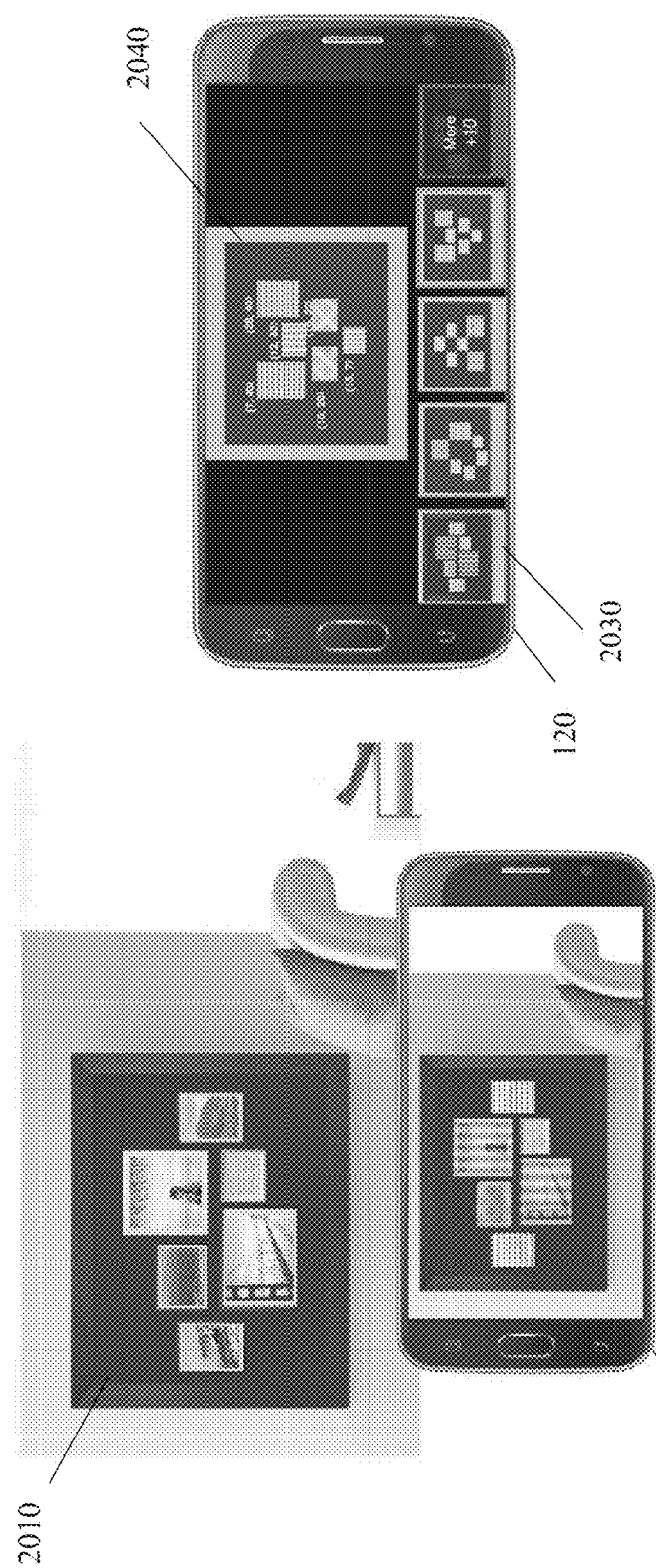
FIGS. 18A-B show an example illustration of an example template recommendation for an overall canvas layout for multiple display devices, according to one embodiment.

FIGS. 18A-B show an example illustration of an example template recommendation for an overall canvas layout 2010 for multiple display devices, according to one embodiment. A canvas, which is a flat panel affixed to the wall, is used to mount the displays. Electronic device 120 already knows the details of the canvas, such as its dimensions, the spacing of mounting slots etc., and when switched to canvas mode, takes these details into consideration for its calculations. In one example, a picture is captured of the overall canvas 2010 layout using electronic device 120. The size of the canvas 2010 is fixed and known to the electronic device 120. The visual app 129 (FIG. 2) may calculate the number of possible combinations of placement of the display devices based on the size of the canvas 2010, the sizes and shapes of the available display devices (e.g., display devices 140, FIG. 2), the power charging positions of such display devices, the power charging positions available on the canvas 2010, etc. (this information may be retrieved during the pairing process or through a separate process, for example, discovery of the canvas 2010).

In canvas mode, the template recommendation is not limited to align a display device along the horizontal direction as in the ledge mode, but also along the vertical direction. Each template 2030 may also indicate the position marks on a display 2040 that match the same marks on the canvas 2010 to help a user fasten the display devices following the template recommendation. With an easy tool such as this, users can easily set up a wall of display devices in a few hours with complicated arrangements such as that in a heart shape, crescent moon shape, etc., which would have traditionally taken days of planning, measuring, aligning, etc.

In one embodiment, template recommendations may be applied to a tile mode as well. In one embodiment, the electronic device 120 captures an image of the layout of the tiles using her smart phone. The user is allowed to carve out certain areas or tiles from a picture indicating that display devices should not be placed at these positions. The visual app 129 (FIG. 2) then recommends where to place display devices for the remaining available tiles, for the selected content, to achieve the most aesthetic display effect. In situations where the ledge or canvas used by user is unknown or when the user mounts on surfaces such as tabletops whose dimensions are unknown, the system is able to provide options and recommendations for possible layouts, but would not be able to provide specific measurements or positions to where the display devices 140 would need to be placed.

Arrangement recommendations can also be influenced by other factors. Because these display devices are networked, it is possible to then bring out a social element. In one example, real-time information as to what are the popular arrangement styles that users across the country prefer may be collected and recommended to others. On the contrary, if someone prefers a unique arrangement, recommendations for the least chosen arrangements may be made. Certain arrangements are geometrically symmetric and are more visually pleasing. These may be made as special recommendations for the user. In one embodiment, the arrangements a user had previously used may be tracked, such that these arrangements may be switched back to rather easily. This allows for temporary re-arrangement of displays during parties, holiday season, etc., but the arrangements may then be placed back exactly how they were before the re-arrangements. In one embodiment, the template recommendations are made based on the content selected to be displayed in the cluster of displays. For example, in special scenarios such as a single image is spread across multiple images randomly, random template arrangements, may affect the aesthetic feel of the image being displayed. The system at this point can recognize that a single image is being spread across multiple displays and only suggest valid template options or recommendations for the involved displays.

In one embodiment, in any of the above mentioned arrangement modes, the mounting surface (ledge/canvas) may contain LED lights distributed across the mount. Once calculations are done by the electronic device 120 (or separately processed), these LED lights may blink, so the user can directly place the display device at that location. This removes the necessity to even look for numbers or a measurement. In another embodiment, when these mounting surfaces contain sensors to assess placement/mounting of display devices, they may also confirm that the user has performed the right operation. The electronic device 120 may then notify the user at every stage of accomplishment in performing the mounting/arranging operation, guiding them. This significantly reduces the cognitive load of the user and allows them to enjoy the act of mounting and arranging display devices.

FIG. 19 shows an example illustration of different viewing perspectives for multiple display devices on a wall 2110. As shown, a person 2130 standing closer to the wall 2110 has a different viewing perspective than a person 2140 standing farther away from the wall 2110. On the right side of FIG. 19, the perspectives of the person 2130 and 2140 are represented by point 2131 and 2141, respectively, in a geometrical graphical representation 2120. The difference in perspectives affects the way the wall 2110 of display devices may be perceived.

FIGS. 20A-D show an example illustration of determining the position of an ideal view point, based on the size, shape and overall layout of multiple display devices, according to one embodiment. As shown in FIG. 20A, multiple display devices (e.g., display devices 140, FIG. 2) are arranged on a wall 2210. In FIG. 20B, an electronic device 120 captures a view of the wall 2210. In FIG. 20C the electronic device 120 performs measurements to guide users to adjust arrangement of the display devices, and the electronic device 120 shows a progress display 2220 as measuring. When users are securing the display devices, for example, onto wall 2210, they are close to the display devices such that they cannot have a good view of the overall effect from the usual viewing position of a distance away from the wall 2210. Additionally, being that close provides a very distorted perspective view, which makes it hard to read straight lines and hence estimate how well a display device is aligned with the horizontal, or with respect to another display device. Typically, the ideal spot that provides the best and least distorted viewing experience is some distance away from the wall 2210 and directly facing the wall 2210 (e.g., the person 2140, FIG. 19 as compared to the person 2130). In FIG. 20D, after taking measurements and processing the display devices on the wall 2210, a projected view 2230 is provided, which is a generated image of a view of the wall 2210 from the ideal viewing spot or position of the display devices with content displayed.

In one embodiment, the user that is arranging the display devices may take a picture or a video of all the display devices from any perspective, using the electronic device 120. A perfectly rectangular object, for example, may appear deformed when the image is taken from a perspective that is not perpendicular to its plane (e.g., the image on the electronic device shown in FIG. 20B). Once the display devices are paired with the electronic device 120 to obtain required information such as the image displayed in each electronic device 120, their physical dimensions etc., the sensor(s) of the electronic device 120 such as a camera may further determine the distance and angle of the electronic device 120 to the display devices. Alternatively, as the sizes and shapes of the display devices are known to the electronic device 120, the degree of the deformation may be used to calculate the relative position of the user, with respect to the deformed object in the image. As the user moves closer and further away from a display device 140, the size of its virtual overlay increases and decreases respectively. When the user is exactly in front of the display device 140, its ideal viewpoint, the virtual overlay associated with display device 140 has edges that are perfectly at 90 degrees to each other. The more the user moves away from the normal axis sideways or top down, the edges of the virtual overlays stray more from the 90-degree angle to match the distorted perspective. This information may be mathematically generalized using principles of projective geometry, homography, etc., and compared with the known physical dimensions of the display to estimate exactly where, with respect to display device 140, that the user and the electronic device 120 is currently positioned. Once the current position and viewpoint is calculated, the amount of counter rotation and movement required to obtain the ideal viewpoint is then calculated.

In one example, the electronic device 120 is able to determine the position of an ideal view point, based on the size, shape and overall layout of the display devices. The ideal view point would be a position, and at a reasonable distance from the wall, that the electronic device 120 can take an image without causing any deformation. In one embodiment, the visual app 129 (FIG. 2) may calculate how to counter rotate the perspective and crop the captured image by virtually moving the electronic device 120 from the real position recognized to the ideal view point. The orientation of the image may thus be adjusted as if the image is captured by the electronic device 120 at the ideal view point. This way, the user can follow the cropped image to adjust the arrangement of the display devices without requiring additional help from another user, or constantly moving to the ideal viewing spot to check on the display effect. In one embodiment, the electronic device 120 allows the viewer to view not just from this ideal viewpoint, but from any angle and distance with respect to the display devices, as permissible by the resolution of the image. For example, the user can identify a preferred viewpoint, which is not the ideal view point. The cropped image will allow the user to see the effect of the arrangement of the display devices from the preferred viewpoint. In one embodiment, the preferred viewpoint may be determined by visual app 129, based on user preference learned from previous arrangements, and/or environmental data surrounding the display devices (e.g., size of the display space, furniture and/or plants around the display devices that may block the view of the display devices, areas that have the line sight to the display devices that the user frequently presides, etc.).

FIGS. 21A-D show an example illustration of capturing a frame, analyzing the prominent colors in a room 2310 and displaying these colors as a scrollable list 2320 and presenting images 2330/2331 based on the list 2320 on an electronic device 120, according to one embodiment. In one example, the detected ambient colors of a room 2310 may be used to recommend images/art work from either the user's collection (e.g., gallery, albums, etc.) or from curated services, that best match the color palette of the ambience in the room 2310. In one example, FIG. 21A shows a user pointing the electronic device 120 camera 128 (FIG. 2) at their room 2310. The electronic device 120 captures a frame, analyzes the prominent colors in the room 2310 and displays them as a scrollable list 2320 at the bottom of the screen. When the user presses on any of the colors (e.g., color 2321) in the list 2320, the visual app 129 then sifts through its database, looking for images which have this selected color as its dominant color and presents them to the user as a scrollable collection of images 2330 as shown in FIG. 21C. Similarly, a selection of color 2321 results in a collection of images 2331 in FIG. 21C. The user can select an image of interest and use this for curation of images for the display devices on the wall 2310.

Figures 22A, 22B, 22C:
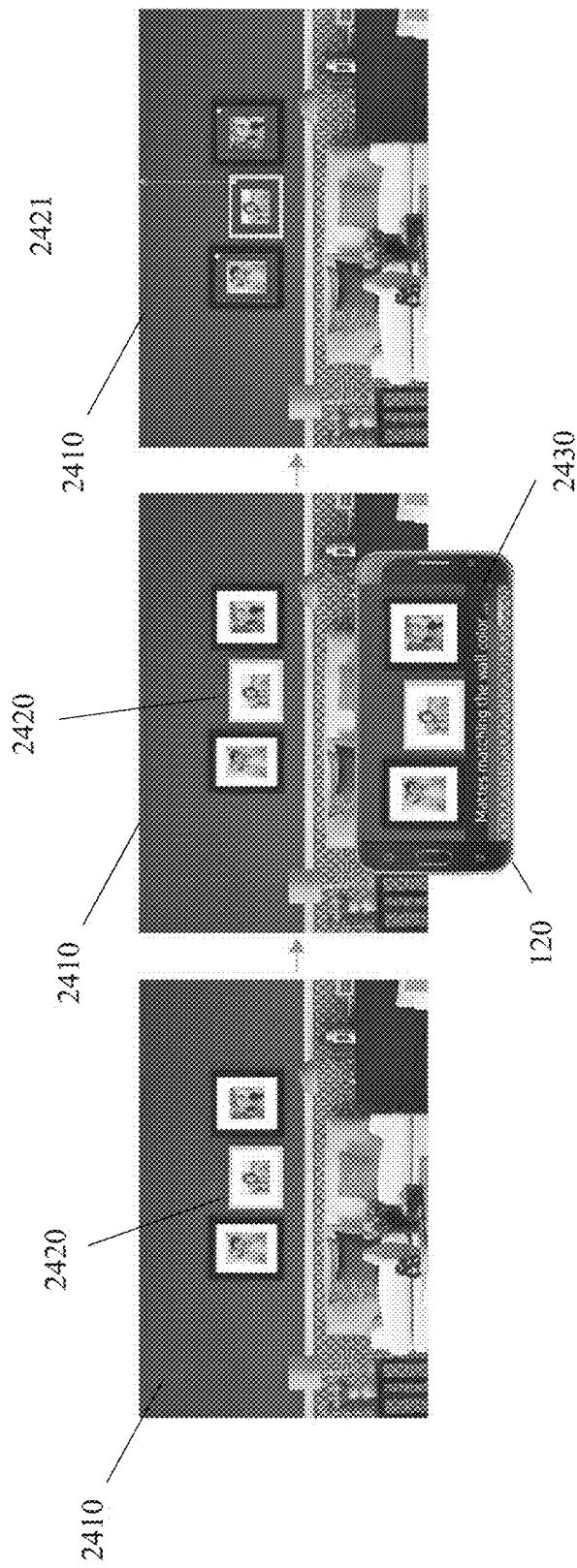
FIGS. 22A-C show an example illustration of assessing the color of a wall surrounding a display frame and using that information to color match the mat of a display device, according to one embodiment.

FIGS. 22A-C show an example illustration of assessing the color of a wall 2410 surrounding a display device frame and using that information to color match the mat 2420 of the display device, according to one embodiment. Most picture frames available on the market come with a mat. Mats usually serve the purpose of bringing attention to the picture by providing color relief and separation from the plethora of information surrounding the frame. These mats are mostly made of paper, but do also come in a variety of textures and colors. Some picture frames have transparent mats, which are see through and pick up the color of the wall behind it. With digital display devices, one embodiment simulates the experience of a mat using digital mats, which serve the same purpose as their analog picture frame counter parts.

In one embodiment, a computer vision technique is used to assess the color of the wall 2410 surrounding a display device and using that information to color the mat 2420. In one example, the electronic device 120 captures the image of the wall 2410, analyzes the color components of the wall 2410, and provides a selection of mats 2430 matching the wall 2410 color(s) in FIG. 22B. In FIG. 22C, a selection of a mat from the selection of mats 2430 is made and the mat 2420 of the center display device is changed to mat 2421.

FIGS. 23A-C show an example illustration of identifying repeating patterns on a wall 2510, and digitally synthesizing the patterns to provide a similar transparent mat effect for a display device, according to one embodiment. In one example, an effect achieved is similar to that of having a transparent mat (e.g., clear or see through glass) around photo/video content on the display device of the wall 2510. Walls with patterned designs such as tiles, bricks and wallpaper are popular in many parts of the world. One embodiment may be extended to these patterned walls. If the repeating patterns are small enough, a single image is captured that contains at least a few examples of the pattern, fully visible and unoccluded by other objects. The system then identifies this repeating pattern and stores it for future processing. If the repeating patterns are too large, or the room is setup in a manner that the fully visible examples are far from each other, the user can achieve a similar effect by stitching together multiple overlapping images to form a single large image. A step is performed, where multiple images of the wall 2510 on which the display device is mounted. These images are then processed using computer vision and stitched together to form one large image. In one embodiment, if the electronic device supports it, a single large image covering the display device (and any other display devices) and a substantial portion of the wall 2510 will also do. A process analyzes the stitched image to identify repeating patterns, their arrangement and spatial relationship to the location of the display device (e.g., pattern matching using instance-level object detection, category-level object recognition, block-based visual-pattern matching, etc.). In one embodiment, the system runs a process that performs the following: a) the image is analyzed to identify a pattern that is clearly repeating across the image; b) the identified pattern is then separated via cropping and stored in a database for reference along with other meta data (referred to herein as the reference pattern); c) the immediate borders surrounding each display device 140 is then analyzed for presence of patterns; d) these border patterns are then checked to see if they are a subset of the identified reference pattern; e) once there is a match, then it is determined that the detected border pattern is actually larger, consisting of all of the information as that of the reference pattern, and portions of it being occluded by the display device 140; f) subsequently, the regions of the pattern that would have been visible but are currently occluded by display device 140's mat 2520 area are digitally synthesized via region filling and rendered in the accurate location. FIG. 23C shows the result mat 2521 matching the pattern on the wall 2510 to provide a transparent mat effect.

In another example, a wall may have a brick texture pattern. In this example, a display device on the wall originally has a white mat. In this example, the user desires to have a clear mat effect on the display device. An electronic device 120 captures an image of the wall and analyzes the wall pattern to simulate a clear mat such that the pattern of the wall continues in the mat region of the display device. The mat is changed to a mat that appears to be clear as the pattern of the wall continues into the mat region.

When the user has the ability to capture an image of the wall without the display devices 140, either prior to mounting or is able to temporarily remove and mount the display devices 140, another example is described below. The underlying technology may be thought of as a subtraction mechanism. In one embodiment, an image A of the wall is captured without the display devices 140. Then the display devices 140 and the respective images are placed at their correct locations and another image B is captured. Computer vision technology is used to align the two images A and B, and a one-on-one comparison is processed to figure out regions C that are visible in image A, but are being occluded in image B. The respective pixels from C that lie on the mat area of each of these display devices 140 are then determined. Texture coordinates for these regions are calculated and then sent to the respective display devices, which then display content from original image A in the mat area to provide an illusion of a clear mat. This embodiment is especially useful in scenarios when every instance of the repeating pattern is occluded in one way or the other, making it hard for other embodiment processing to execute. This technique is also very valuable in scenarios where instead of a repeating pattern, the wall is decorated with one large design such as a photo, painting or mural where the above embodiment is not usable due to absence of a repeating pattern.

FIGS. 24A-C show an example of customizing matting for imaging on a display device, according to an embodiment. In one embodiment, control is provided to the user as to how much of a mat they would like to see. In the example shown in FIG. 24A, the electronic device 120 camera 128 (FIG. 2) is pointed at a display device 2610 having a mat 2615. An outer mat control interface 2620 and an inner mat control interface 2630 are displayed on the electronic device 120. In the example shown in FIG. 24B, the inner mat control interface 2630 is used to adjust the thickness of the mat. In this example, the mat 2615 thickness between the four images is increased, resulting in new mat 2616. In the example shown in FIG. 24C, the outer mat control interface 2620 is used to increase the thickness of the mat 2616, resulting in the new mat 2617. It should be noted that the mat thickness may be decreased as well if desired by adjusting the scroll bars for the outer mat control interface 2620 and the inner mat control interface 2630.

FIGS. 25A-B shows another example of customizing matting for imaging on a display device, according to an embodiment. FIG. 25A shows an example where the electronic device 120 camera 128 (FIG. 2) is pointed at a display device 2710 having a mat 2715. As shown in FIG. 25B, the mat may be touched and dragged from the corner 2720 either inwards or outwards to increase, decrease or remove altogether the mat 2715. In this example, the mat 2715 has its thickness increased resulting in mat 2716 shown on the display 2710.

Figure 26:
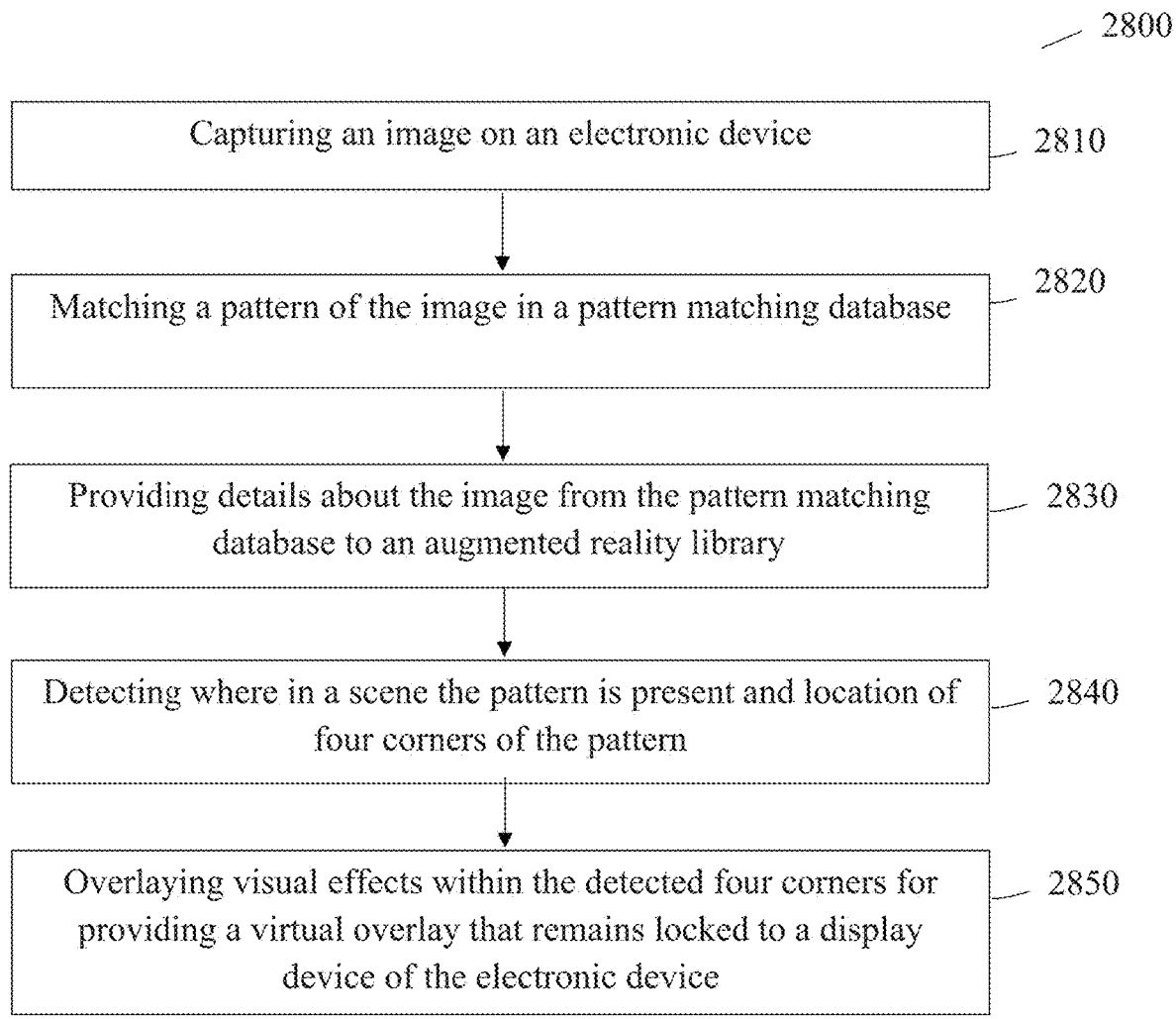
FIG. 26 shows a block diagram of a process for overlaying visual effects on a captured image, according to one embodiment.

FIG. 26 shows a block diagram of a process 2800 for overlaying visual effects on a captured image, according to one embodiment. In one embodiment, in block 2810 process 2800 provides, when the electronic device is pointed at a display device (e.g., a display device 140), capturing of an image displayed in the display device on an electronic device (e.g., with a camera 128 of electronic device 120, FIG. 2). In block 2820, a pattern of the image is matched in a pattern matching database (e.g., using a matching processor (e.g., processor 3111, FIG. 29) or process (e.g., visual app 129, FIG. 2 or content curation and display management processing 3130), which is part of the AR library (e.g., part of visual app 129 and/or applications 1-N 127), resides on electronic device 120 and is trained to detect a finite set of images). In block 2830, if the image is present in the pattern matching database, the details are provided to an AR library, such as presence of an image, the name of the image identified, etc. In block 2840 process 2800 detects where in a scene the pattern is present and the location of the four corners of the pattern. In one example, the AR library uses its computer vision process or processor to determine where in the scene this pattern is present and the details. In block 2850, visual effects are overlayed within the detected four corners for providing a virtual overlay that remains locked to a display device of the electronic device. In one example, the AR library uses its computer graphics process or processor to overlay desired visual effects within the detected four corners, that provide the illusion of a virtual overlay that remains locked to the display device.

Figure 27:
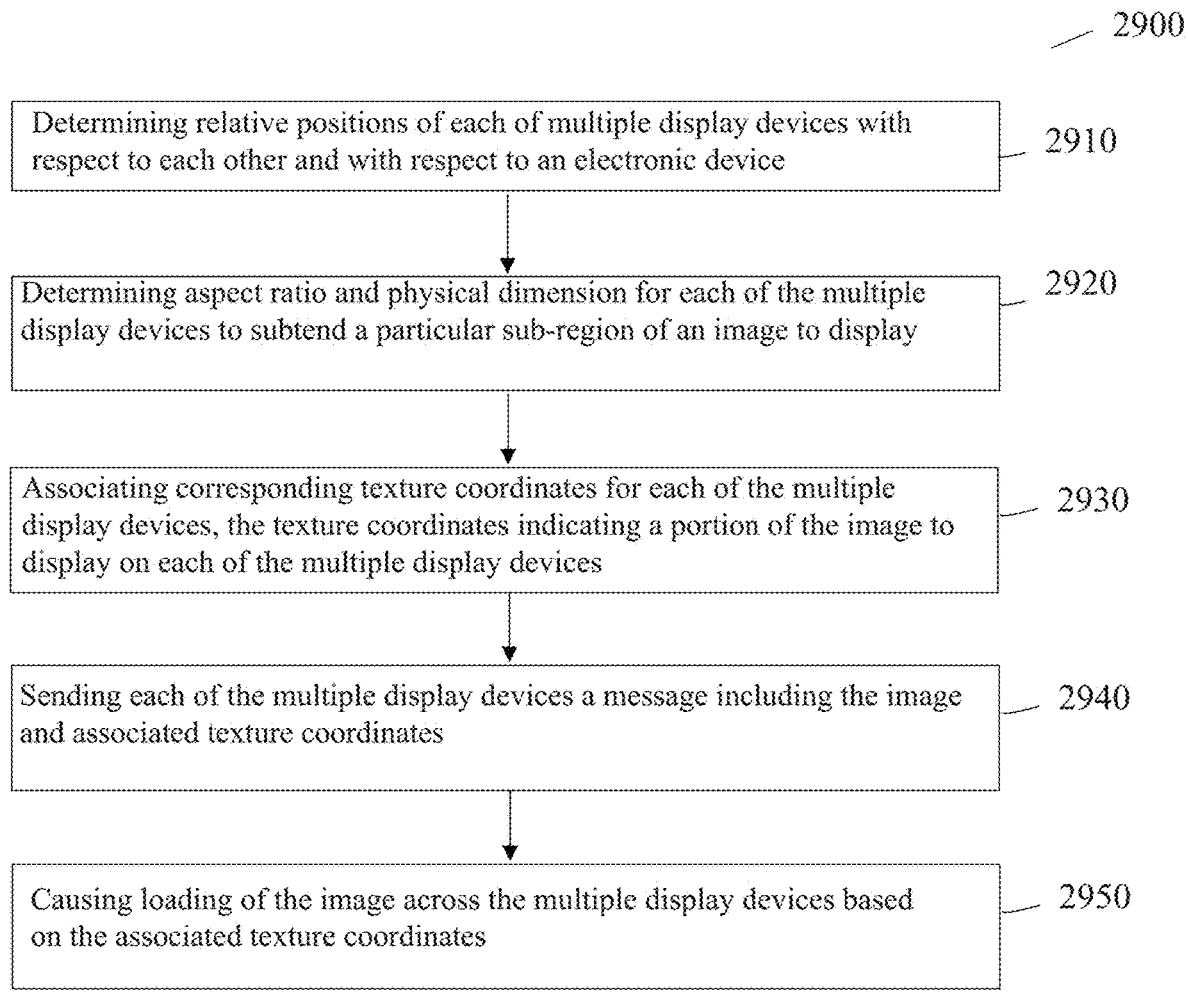
FIG. 27 shows a block diagram of a process for spreading an image over multiple display devices, according to one embodiment.

FIG. 27 shows a block diagram of a process 2900 for spreading an image over multiple display devices, according to one embodiment. In one embodiment, block 2910 provides determining relative positions of each of multiple display devices (e.g., display devices 901, 902 and 903, FIGS. 7A-7D) with respect to each other and with respect to an electronic device (e.g., electronic device 120). In block 2920 process 2900 provides determining aspect ratios and physical dimensions for each of the multiple display devices to subtend a particular sub-region of an image to display. In block 2930 process 2900 provides for associating corresponding texture coordinates for each of the multiple display devices. The texture coordinates indicating a portion of the image to display on each of the multiple display devices. In block 2940 process 2900 provides for sending each of the multiple display devices a message including the image and associated texture coordinates. In block 2950 process 2900 provides causing loading of the image across the multiple display devices based on the associated texture coordinates.

Figure 28:
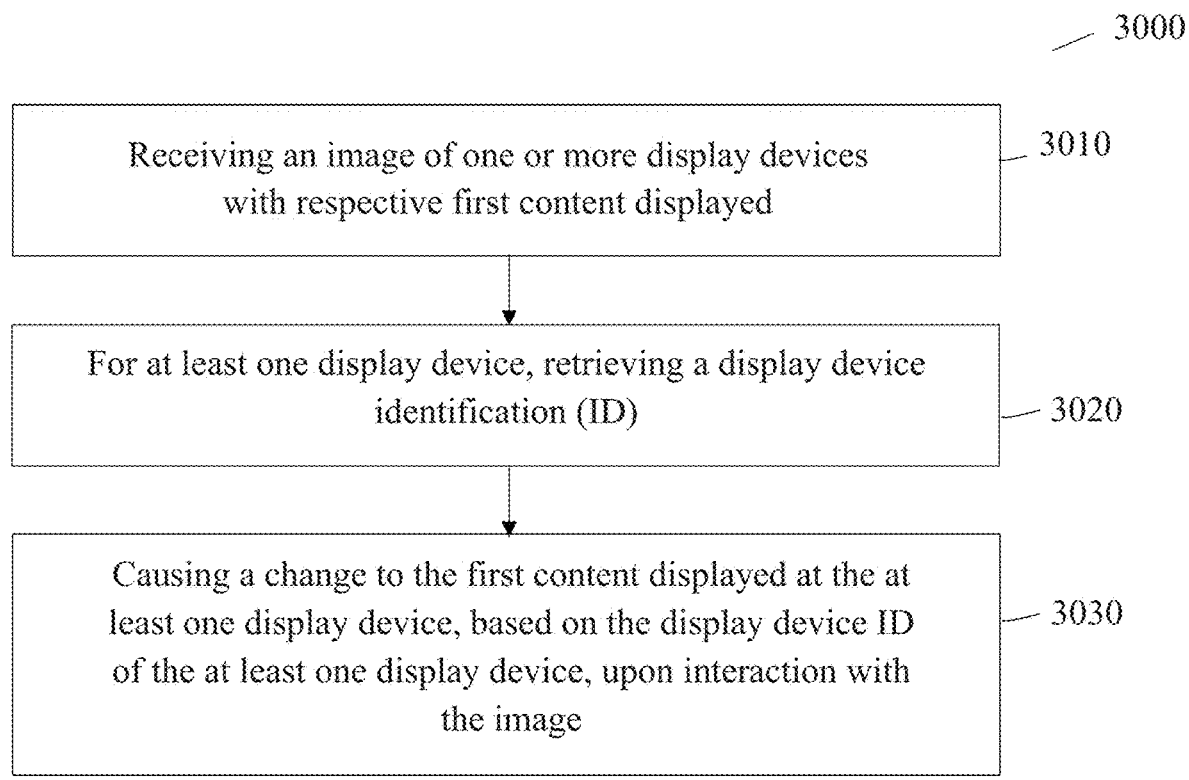
FIG. 28 shows a block diagram of a process for configuring and controlling display devices, according to one embodiment.

FIG. 28 shows a block diagram of a process 3000 for configuring and controlling display devices, according to one embodiment. In one embodiment, in block 3010 process 3000 receives an image of one or more display devices (e.g., display devices 140, FIG. 2) with respective first content displayed. In block 3020 process 3000 retrieves, for at least one display device, a display device ID. In block 3030, a change to the first content displayed at the at least one display device is caused, based on the display device ID of the at least one display device, upon interaction with the image.

In one embodiment, process 3000 may further include delineating regions, on the image, via a computer vision technique, where each region corresponds to a distinctive display device. Interaction with the image including interaction with at least one of the regions. Process 3000 may additionally cause a second content to be sent to at least two display devices for display. The second content is displayed across the at least two display devices maintaining the spatial relationship of the second content.

In one embodiment, process 3000 may further include performing content recognition based on display device ID using computer vision. Additionally, one or more display devices may be linked to a network and content recognition may be performed accessing a pattern library. In one example, a user interface (e.g., using electronic device 120, FIG. 2) provides selection of display devices and interaction with the selected display devices.

In one embodiment, process 3000 may include overlaying one or more display devices on a user interface to enable various gestures for managing content displayed on the one or more display devices. Additionally, process 3000 may include receiving a selection of a portion of an image of the first content, receiving instructions to crop the portion, and causing the cropped portion to be displayed in a selected display device of the one or more display devices.

In one embodiment, process 3000 may include receiving a selection of one or more portions of an image of the second content, receiving cropping instructions to crop the one or more portions, and causing the cropped one or more portions to be displayed across the at least two display devices.

Figure 29:
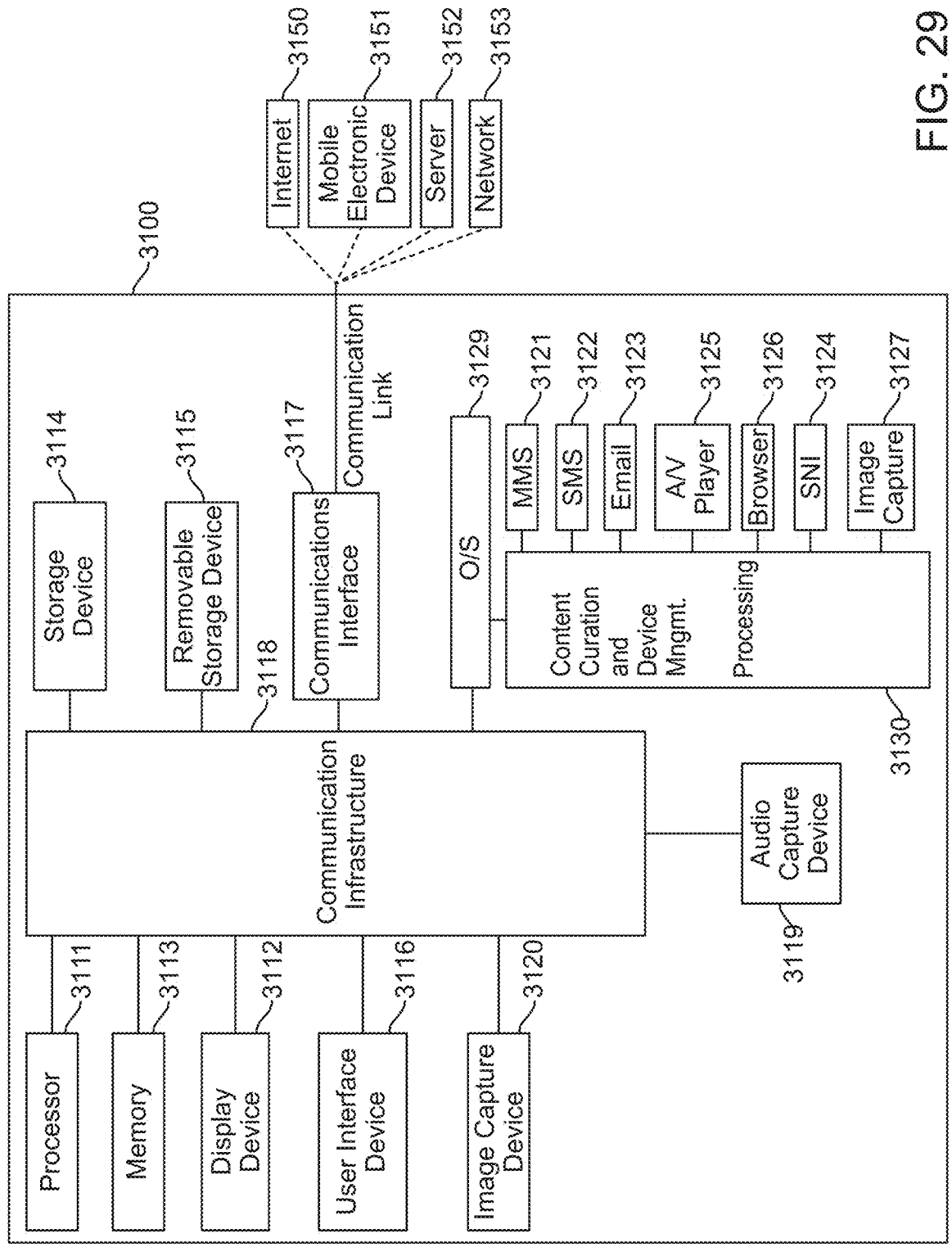
FIG. 29 is a high-level block diagram showing an information processing system comprising a computing system implementing one or more embodiments.

FIG. 29 is a high-level block diagram showing an information processing system comprising a computing system 3100 implementing one or more embodiments. The system 3100 includes one or more processors 3111 (e.g., ASIC, CPU, etc.), and may further include an electronic display device 3112 (for displaying graphics, text, and other data), a main memory 3113 (e.g., random access memory (RAM), cache devices, etc.), storage device 3114 (e.g., hard disk drive), removable storage device 3115 (e.g., removable storage drive, removable memory, a magnetic tape drive, optical disk drive, computer-readable medium having stored therein computer software and/or data), user interface device 3116 (e.g., keyboard, touch screen, keypad, pointing device), and a communication interface 3117 (e.g., modem, wireless transceiver (such as Wi-Fi, Cellular), a network interface (such as an Ethernet card), a communications port, or a PCMCIA slot and card).

The communication interface 3117 allows software and data to be transferred between the computer system and external devices through the Internet 3150, mobile electronic device 3151, a server 3152, a network 3153, etc. The system 3100 further includes a communications infrastructure 3118 (e.g., a communications bus, cross bar, or network) to which the aforementioned devices 3111 through 3117 are connected.

The information transferred via communications interface 3117 may be in the form of signals such as electronic, electromagnetic, optical, or other signals capable of being received by communications interface 3117, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 3100 further includes an image capture device 3120, such as a camera 128 (FIG. 2), and an audio capture device 3119, such as a microphone 122 (FIG. 2). The system 3100 may further include application processing or processors as MMS 3121, SMS 3122, email 3123, social network interface (SNI) 3124, audio/video (AV) player 3125, web browser 3126, image capture 3127, etc.

In one embodiment, the system 3100 includes content curation and display management processing 3130 that may implement processing similar as described regarding visual app 129 (FIG. 2) and processing content curation, display device management as described above. In one embodiment, the content curation and display management processing 3130 along with an operating system 3129 may be implemented as executable code residing in a memory of the system 3100. In another embodiment, the content curation and display management processing 3130 may be provided in hardware, firmware, etc.

One or more embodiments provide intuitive and easy curation of display devices (e.g., display devices 140, FIG. 2) in a visual manner, and may function by tracking the images in the display device itself. The one or more embodiments do not require additional visual markers such as AR patterns, bar codes and QR codes. Advanced interactions, such as drag and drop are employed to assign content to display devices. Applying special effects to specific display devices is provided via advanced spatial interactions. Spreading an image across multiple display devices are provided in a spatially coherent manner. Selecting important regions/features of interest in an image to be displayed to specific display devices is provided. The one or more embodiments enable spatially intelligent editing of images based on the size and aspect ratio of the display device that the image is going to be assigned to.

The one or more embodiments provide virtual representations of a cluster of display devices as virtual walls, which may be saved, retrieved and curated even when geographically separated from the physical displays with the same user experience. Dynamic creation of groups of displays and their characteristics/behavior is provided. Several types of group interactions via unique UI mechanisms are provided. Suggestions for selection of filters based on neighboring image content and ambience of the display devices such as physical wall color and lighting is provided. Suggestions for the most suitable photos/content either from a local collection or curated services based on ambient information is provided.

The one or more embodiments provide suggestions of various templates and patterns of arrangement by detecting the number of display devices to be mounted and their various shapes and sizes, and perform calculations and provide precise measurements to achieve a selected pattern. Real-time position and alignment feedback is provided and corrections and guidelines are also provided in order to achieve a selected pattern. A far-away perspective of a cluster of displays is provided, even when standing close by to them, which assists with decisions about positioning and alignment. The environment is analyzed to mimic its features such as colors, texture and patterns within digital mat regions, resulting in blending of the digital frames with the environment and pleasing visual effects.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for content management, comprising:

receiving, by an electronic device, a captured photo including images of an environment and one or more physical display devices with respective first content currently displayed;

on a user interface, overlaying each of the images of the one or more physical display devices in the captured photo with an outline region;

recognizing a displayed feature of the first content displayed on at least one physical display device;

identifying a display device of the at least one physical display device based on the recognized displayed feature of the first content, wherein the display device is identified using a plurality of physical markers disposed on a border of the one or more physical display devices;

controlling the first content displayed on the at least one physical display device comprising: selecting content matching one or more patterns in a pattern matching database in two or more portions of the first content; automatically overlaying box regions, by the electronic device, around the two or more portions; causing only the content within the box regions to currently be displayed on a selected one of the at least one physical display device and at least one other selected physical display device, upon interaction with the captured photo via the electronic device, wherein each of the two or more portions having less content than the first content.

2. The method of claim 1, further comprising:
delineating regions, on the captured photo, via a computer vision technique, each region corresponding to a distinctive display device of the one or more physical display devices, wherein interaction with the captured photo including interaction with at least one of the one or more regions, and a display device identification (ID) is retrieved from a look up table that includes a relationship between the display device ID and currently displayed image.

3. The method of claim 1, further comprising:
causing a second content to be sent to at least two display devices of the one or more physical display devices for display;
wherein the second content is displayed across the at least two display devices maintaining spatial relationship of the second content, and the outline region is on top of and encompasses each of the images of the one or more physical display devices in the captured photo.

4. The method of claim 2, further comprising:
performing content recognition based on display device ID using computer vision, wherein an image identifier is stored for the displayed feature of the first content, and the plurality of physical markers provides for distinct identification of each display device of the one or more display devices using computer vision
wherein upon a particular box region changing by its corners being dragged, moved or scaled, the changes are tracked and a new position of the box region is recorded without losing display device association.

5. The method of claim 1, wherein:
the one or more physical display devices are linked to a network;
recognizing the displayed feature comprises performing content recognition on the displayed feature based on pattern matching and accessing a pattern library; and
an image identifier is stored for the displayed feature of the first content prior to recognizing the displayed feature.

6. The method of claim 1, further comprising:
analyzing features of the environment in the captured photo; and
mimicking the features of the environment for changing features of digital mat regions of the one or more physical display devices;
wherein the interaction with the captured photo is via the user interface supporting selection of display devices and interaction with the selected display devices, and recognizing the displayed feature comprises performing character recognition on the displayed feature.

7. The method of claim 1, wherein
the user interface enables various gestures for managing content displayed on the one or more physical display devices, the displayed feature of the first content comprises a watermark marker, and an aspect ratio of each box region is always locked to that of a display device it is assigned to even when its scale changes.

8. The method of claim 1, further comprising:
receiving a selection of a portion of an image of the first content;
receiving instructions to crop the portion; and
causing the cropped portion to be displayed in a selected display device of the one or more physical display devices;
wherein only the selected content within the box regions is displayed.

9. The method of claim 1, further comprising:
receiving a selection of one or more portions of an image of the second content;
receiving cropping instructions to crop the one or more portions; and
causing the cropped one or more portions to be displayed across the at least two display devices;
wherein the box regions are user selectable for portions of the first content.

10. A device for content management comprising:
a memory storing instructions; and
at least one processor executing the instructions including a process configured to:
receive, by the device, a captured photo including images of an environment and one or more physical display devices with respective first content currently displayed;
on a user interface, overlay each of the images of the one or more physical display devices in the captured photo with an outline region;
recognize a displayed feature of the first content displayed on at least one physical display device;
identify a display device of the at least one physical display device based on the recognized displayed feature of the first content, wherein the display device is identified using a plurality of physical markers disposed on a border of the one or more physical display devices; and
control the first content currently displayed on the at least one physical display device comprising: selecting content matching one or more patterns in a pattern matching database in two or more portions of the first content; automatically overlaying box regions, by the device, around the two or more portions; causing only the content within the box regions to currently be displayed on a selected one of the at least one physical display device and at least one other selected physical display device, upon interaction with the captured photo via the device, wherein each of the two or more portions having less content than the first content.

11. The device of claim 10, wherein the process is further configured to:
delineate regions, on the captured photo, via a computer vision technique, each region corresponding to a distinctive display device of the one or more physical display devices, wherein interaction with the captured photo including interaction with at least one of the one or more regions, a display device identification (ID) is retrieved from a look up table that includes a relationship between the display device ID and currently displayed image, and an image identifier is stored for the displayed feature of the first content.

12. The device of claim 10, wherein the process is further configured to:
cause a second content to be sent to at least two display devices of the one or more physical display devices for display;
wherein:
the second content is displayed across the at least two display devices maintaining the spatial relationship of the second content;
the plurality of physical markers provides for distinct identification of each display device of the one or more display devices using computer vision;

an image identifier is stored for the displayed feature of the first content prior to recognition of the displayed feature;

the outline region is on top of and encompasses each of the one or more physical display devices in the captured photo;

an aspect ratio of each box region is always locked to that of a display device it is assigned to even when its scale changes; and upon a particular box region changing by its corners being dragged, moved or scaled, the changes are tracked and a new position of the box region is recorded without losing display device association.

13. The device of claim 10, further comprising:

providing selection of display devices and interaction with the selected display devices via the user interface;

analyzing features of the environment in the captured photo; and using the features of the environment for changing features of digital mat regions of the one or more physical display devices;

wherein:
recognizing the displayed feature of the first content comprises at least one of:
performing content recognition on the displayed feature based on pattern matching and accessing a pattern library;
performing character recognition on the displayed feature; or
identifying a watermark marker of the first content; and
only the selected content within the box regions is displayed.

14. The device of claim 10, wherein:

the process is further configured to:
receive a selection for a portion of an image of the first content;
receive crop instructions to crop the portion; and
display the cropped portion in a selected display device of the one or more physical display devices; and
the box regions are user selectable for portions of the first content.

15. A non-transitory processor-readable medium that includes a program that when executed by a processor performing a method comprising:

receiving, by an electronic device, a captured photo including images of an environment and one or more physical display devices with respective first content currently displayed;

on a user interface, overlaying each of the images of the one or more physical display devices in the captured photo with an outline region;

recognizing a displayed feature of the first content displayed on at least one physical display device;

identifying a display device of the at least one physical display device based on the recognized displayed feature of the first content, wherein the display device is identified using a plurality of physical markers disposed on a border of the one or more physical display devices; and controlling the first content displayed on the at least one physical display device comprising: selecting content matching one or more patterns in a pattern matching database in two or more portions of the first content; automatically overlaying box regions, by the electronic device, around the two or more portions; causing only the content within the box regions to currently be displayed on a selected one of the at least one physical display device and at least one other selected physical display device, upon interaction with the captured photo via the electronic device, wherein each of the two or more portions having less content than the first content.

16. The non-transitory processor-readable medium of claim 15, further comprising:

delineating regions, on the captured photo, via a computer vision technique, each region corresponding to a distinctive display device of the one or more physical display devices, wherein interaction with the captured photo including interaction with at least one of the one or more regions, a display device identification (ID) is retrieved from a look up table that includes a relationship between the display device ID and currently displayed image, and an image identifier is stored for the displayed feature of the first content.

17. The non-transitory processor-readable medium of claim 15, further comprising:

causing second content to be sent to at least two display devices of the one or more physical display devices for display;

wherein:
the second content is displayed across the at least two display devices maintaining the spatial relationship of the second content;
the plurality of physical markers provides for distinct identification of each display device of the one or more display devices using computer vision;
an image identifier is stored for the displayed feature of the first content prior to recognizing the displayed feature;
the outline region is on top of and encompasses each of the one or more physical display devices in the captured photo;
an aspect ratio of each box region is always locked to that of a display device it is assigned to even when its scale changes; and
upon a particular box region changing by its corners being dragged, moved or scaled, the changes are tracked and a new position of the box region is recorded without losing display device association.

18. The non-transitory processor-readable medium of claim 15, wherein:

the one or more physical display devices are linked to a network;

recognizing the displayed feature of the first content comprises at least one of:
performing content recognition on the displayed feature based on pattern matching and accessing a pattern library;
performing character recognition on the displayed feature; or
identifying a watermark marker of the first content; and
only the selected content within the box regions is displayed.

19. The non-transitory processor-readable medium of claim 15, further comprising:

analyzing features of the environment in the captured photo; and using the features of the environment for changing features of digital mat regions of the one or more physical display devices;

wherein:
the user interface enables various gestures for managing content displayed on the one or more physical display devices; and
the box regions are user selectable for portions of the first content.

20. The non-transitory processor-readable medium of claim 15, further comprising:
receiving a selection of a portion of an image of the first content;
receiving instructions to crop the portion; and
causing the cropped portion to be displayed in a selected display device of the one or more physical display devices.

* * * * *